United States Patent
Wilkins et al.

(10) Patent No.: US 7,716,059 B1
(45) Date of Patent: *May 11, 2010

(54) NETWORK-BASED CHILD SUPPORT FRAMEWORK

(75) Inventors: David Wilkins, Tallahassee, FL (US); John Nichols, Sacramento, CA (US); Jim Fredricks, Kennesaw, GA (US); Keith Ketcher, Cheyenne, WY (US)

(73) Assignee: Accenture Global Services GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/560,665

(22) Filed: Apr. 27, 2000

(51) Int. Cl.
   *G06Q 99/00* (2006.01)
(52) U.S. Cl. .......................................... 705/1
(58) Field of Classification Search ............... 705/1, 705/30, 35, 39, 40, 42
   See application file for complete search history.

(56) References Cited

U.S. PATENT DOCUMENTS

| | | | |
|---|---|---|---|
| 5,265,007 A | 11/1993 | Barnhard, Jr. et al. | |
| 5,283,829 A | 2/1994 | Anderson | |
| 5,369,699 A | 11/1994 | Page et al. | |
| 5,383,113 A | 1/1995 | Kight et al. | |
| 5,465,206 A | 11/1995 | Hilt et al. | |
| 5,649,117 A * | 7/1997 | Landry | 705/40 |
| 5,652,786 A | 7/1997 | Rogers | |
| 5,699,528 A * | 12/1997 | Hogan | 705/40 |
| 5,873,072 A * | 2/1999 | Kight et al. | 705/40 |
| 5,893,080 A * | 4/1999 | McGurl et al. | 705/40 |
| 5,903,873 A | 5/1999 | Peterson et al. | |
| 5,943,656 A * | 8/1999 | Crooks et al. | 705/30 |
| 5,946,669 A * | 8/1999 | Polk | 705/40 |
| 5,956,700 A * | 9/1999 | Landry | 705/40 |
| 5,983,205 A | 11/1999 | Brams et al. | |
| 6,052,671 A | 4/2000 | Crooks et al. | |
| 6,058,380 A * | 5/2000 | Anderson et al. | 705/40 |
| 6,078,907 A | 6/2000 | Lamm | |
| 6,119,107 A * | 9/2000 | Polk | 705/40 |
| 6,311,169 B2 | 10/2001 | Duhon | |
| 6,334,116 B1 * | 12/2001 | Ganesan et al. | 705/34 |
| 6,401,079 B1 | 6/2002 | Kahn et al. | |
| 6,598,167 B2 | 7/2003 | Devine et al. | |

FOREIGN PATENT DOCUMENTS

WO    WO 99/10823    *    3/1999

OTHER PUBLICATIONS

DSHS Child Support Computer System Achieves Federal Certification, PR Newswire, Feb. 22, 1996.*

(Continued)

*Primary Examiner*—Jonathan Ouellette
(74) *Attorney, Agent, or Firm*—Finnegan, Henderson, Farabow, Garrett & Dunner, L.L.P.

(57) ABSTRACT

A system, method and article of manufacture are provided for providing a network-based child financial support framework. First, a database is maintained including information on a received financial support payment utilizing a network. Further, general information is provided relating to the financial support payment utilizing the network. The calculation of a proper amount of the financial support payment may also be allowed based on a profile a user. Still yet, a history associated with the financial support payment is displayed.

18 Claims, 32 Drawing Sheets

OTHER PUBLICATIONS www.singleparentcentral.com, Retrieved from Internet Archive Wayback Machine <www.archive.org>, date range: Oct. 13, 1999-Jan. 19, 2000.* www.childsup.cahwnet.gov, Retrieved from Internet Archive Wayback Machine <www.archive.org>, date range: Mar. 4, 2000-May 10, 2000.*

*Dayco* Statement Regarding Related Applications.

Ohio Child Support Calculator (www.alllaw.com).

SupportGuidelines.com (www.supportguidelines.com).

US PTO Office Action issued on U.S. Appl. No. 09/561,615, dated Jul. 24, 2007.

US PTO Office Action issued on U.S. Appl. No. 09/561,615, dated Dec. 5, 2007.

Notice of Allowance issued by the US PTO Jun. 13, 2008 on U.S. Appl. No. 09/561,615.

Office Action issued by the U.S. Patent and Trademark Office in U.S. Appl. No. 09/561,615, dated Nov. 25, 2008.

* cited by examiner

1400

Working to benefit our Children

/Home/Search Our Site/Frequently Asked Questions/Help/Contact Us/Site Map/

Case Payment Information
Recent News On My Case
How can I help manage my case?

Links
Message From The Governor
25 Most Wanted
How do I know if I need child support services
CS Guidelines Calculator
Links To Field Offices
Access to other NM State Services

CASE ID: 6666666

Payment History

| Received Date | Amount Received | Amount Retained | Disbursement to CP |
|---|---|---|---|
| 10/01/1999 | 100.00 | 30.00 | 70.00 |
| 09/01/1999 | 100.00 | 30.00 | 70.00 |
| 08/01/1999 | 100.00 | 30.00 | 70.00 |
| 07/01/1999 | 100.00 | 30.00 | 70.00 |
| 06/01/1999 | 100.00 | 30.00 | 70.00 |
| 05/01/1999 | 100.00 | 30.00 | 70.00 |
| 04/01/1999 | 100.00 | 30.00 | 70.00 |
| 03/01/1999 | 100.00 | 30.00 | 70.00 |
| 02/01/1999 | 100.00 | 30.00 | 70.00 |
| 01/01/1999 | 100.00 | 30.00 | 70.00 |
| 12/01/1998 | 100.00 | 30.00 | 70.00 |

Child Support Guideline Calculator

Complete as much information as possible for both parents.
For detailed instructions download the guidelines.

Who has custody of the children? Mother

| Calculation date as of 12/06/99 | CP | NCP | Combined |
|---|---|---|---|
| Gross Monthly Income | 1000.00 | 2000.00 | $3000.00 |
| Number of Children | | | |
| Basic Support | | | 828.00 |
| Insurance Premium | 10.00 | 10.00 | 20.00 |
| Child Care Cost | 50.00 | 50.00 | 100.00 |
| Additional expense | 100.00 | 100.00 | 100.00 |
| Total Combined Support | 160 | 160 | 4148.00 |

Links
  Home
    Search Our Site
    Frequently Ask Questions
    Help
    Contact Us
    Site Map
    Message From The governor
    25 Most Wanted
  How Do I Know If I Need Child Support Services
  Child Support Guidelines Calculator
  Links To Field Offices
  Access To Other NM State Services Custodial Parent Case Payment Information
    Where's My Money?
    What Is The Amount Due For The Current Month?
    Why didn't I get my child support payment?
    Have you found the Non-Custodial parent of my children?
    Can I view my payment history?
Non-Custodial Parent Case Payment Information
    Where's My Money?
    What is the amount due for the current month?
    Can I view my payment history?
Custodial Parent Recent News On My Case
Non-Custodial Parent Recent News On My Case Custodial Parent Help Manage My Case
    It is important to have you address and the NCP's address current.
    Have you verified your SSN?
    Has the NCP changed job recently?
    Have your child support check directly deposited into your account.
    Keeping a current list of the NCP's assets is important.
    How can I get my support order modified?
    How can I add a new dependent?
 Non-Custodial Parent Help Manage My Case
    It is important to have your address current.
    Have you verified your SSN?
    Have you changed jobs recently?
    How can I get my support order modified?
    How can I arrange to pay for my child support?
  Apply for child support services

1700

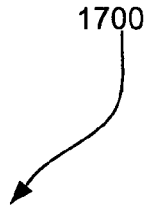

Figure 17

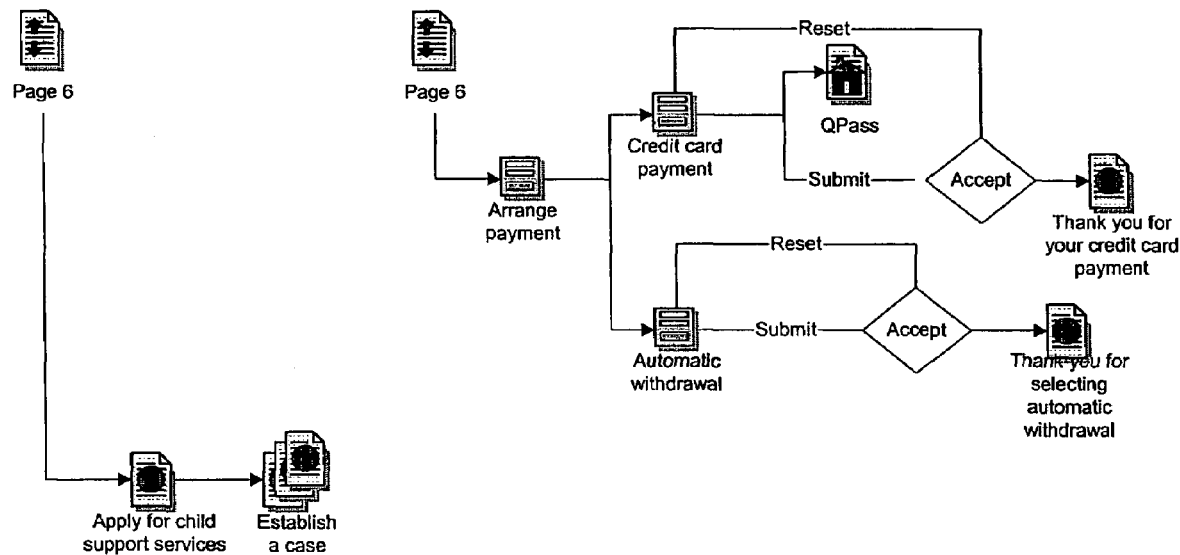
Figure 24

NETWORK-BASED CHILD SUPPORT FRAMEWORK

FIELD OF THE INVENTION

The present invention relates to databases and more particularly to databases for tracking parental financial support.

BACKGROUND OF THE INVENTION

Currently, child support systems rely heavily on telephonic or in-person communications between custodial and non-custodial parents and state agency staff. Even simple questions about such things as status of support payments have to be answered by talking to a staff member with dedicated computer terminals connected directly to intra-agency computer systems, resulting in the custodial parents having very little active participation in the management of their cases.

Parents and state staff members also rely on mail to communicate. However, correspondence sent through the postal system is slow and may get lost. Further, postage costs place a heavy burden on already strained budgets.

What is needed is a system that allows parents involved in a child support case to access information immediately without speaking directly to a state agency staff member or waiting for correspondence.

SUMMARY OF THE INVENTION

A system, method and article of manufacture are provided for providing a network-based child financial support framework. First, a database is maintained including information on a received financial support payment utilizing a network. Further, general information is provided relating to the financial support payment utilizing the network. The calculation of a proper amount of the financial support payment may also be allowed based on a profile a user. Still yet, a history associated with the financial support payment is displayed.

In one embodiment of the present invention, the profile may include data such as income, number of children, basic support, insurance premium, child care cost, and/or additional expenses. The history may include a date, an amount received on the date, an amount retained of the amount received, and a disbursement of the amount received to the custodial parent.

In yet another embodiment of the present invention, a plurality of frequently asked questions may be presented relating to the financial support payment.

BRIEF DESCRIPTION OF THE DRAWINGS

The invention will be better understood when consideration is given to the following detailed description thereof. Such description makes reference to the annexed drawings wherein:

FIG. 14 is a graphical user interface that conveys the payment history information in accordance with the method of FIG. 13;

FIG. 16 is a graphical user interface that executes the calculator function in accordance with the method of FIG. 15;

FIG. 17 is a summary of a proposed site map associated with the present invention;

FIGS. 18-24 show flow diagrams illustrating possible navigation routes during use of the present invention;

DETAILED DESCRIPTION OF THE PREFERRED EMBODIMENTS

The present invention provides an eChild Support Enforcement intention-based, interactive web application that allows parents and employers to exchange information that previously could only be handled on the phone or in person with state agency staff. Using an intention-based question/answer based approach, eChild Support Enforcement lets case participants inquire about the status of their support cases. Thus, custodial and non-custodial parents are allowed access to information which was previously only available to specially trained state agency staff using dedicated computer terminals connected directly to intra-agency computer systems. The application actively engages custodial parents in the management of their cases. The eChild Support Enforcement application provides better methods and tools allowing the custodial parent and the case worker to share information.

Figure 1:
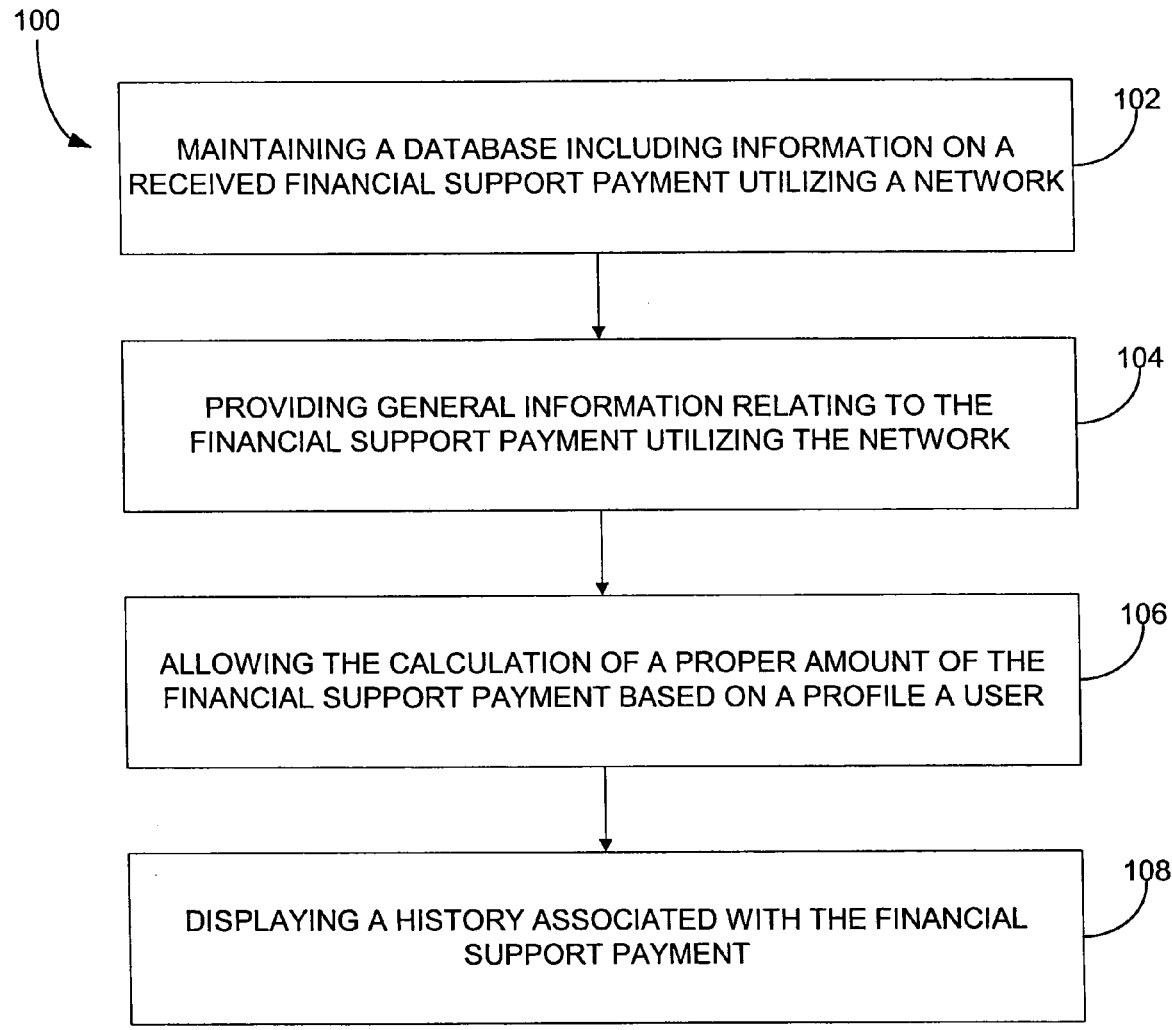
FIG. 1 is a flowchart illustrating a method for providing a network-based child financial support framework.

FIG. 1 is a flowchart illustrating a method 100 for providing a network-based child financial support framework. First, in operation 102, a database is maintained including information on a received financial support payment utilizing a network. Further, in operation 104, general information is provided relating to the financial support payment utilizing the network. The calculation of a proper amount of the financial support payment may also be allowed based on a profile a user, as indicated in operation 106. Still yet, in operation 108, a history associated with the financial support payment is displayed.

Figure 1A:
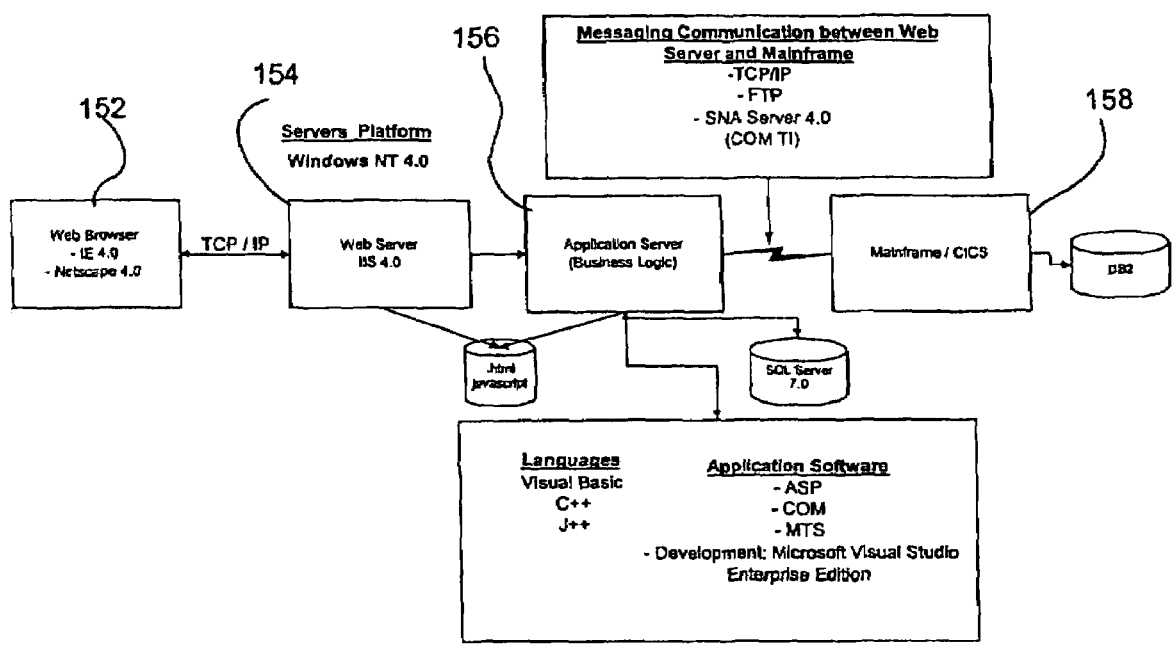
FIG. 1A illustrates an exemplary network architecture for implementing the present invention.
Figure 2:
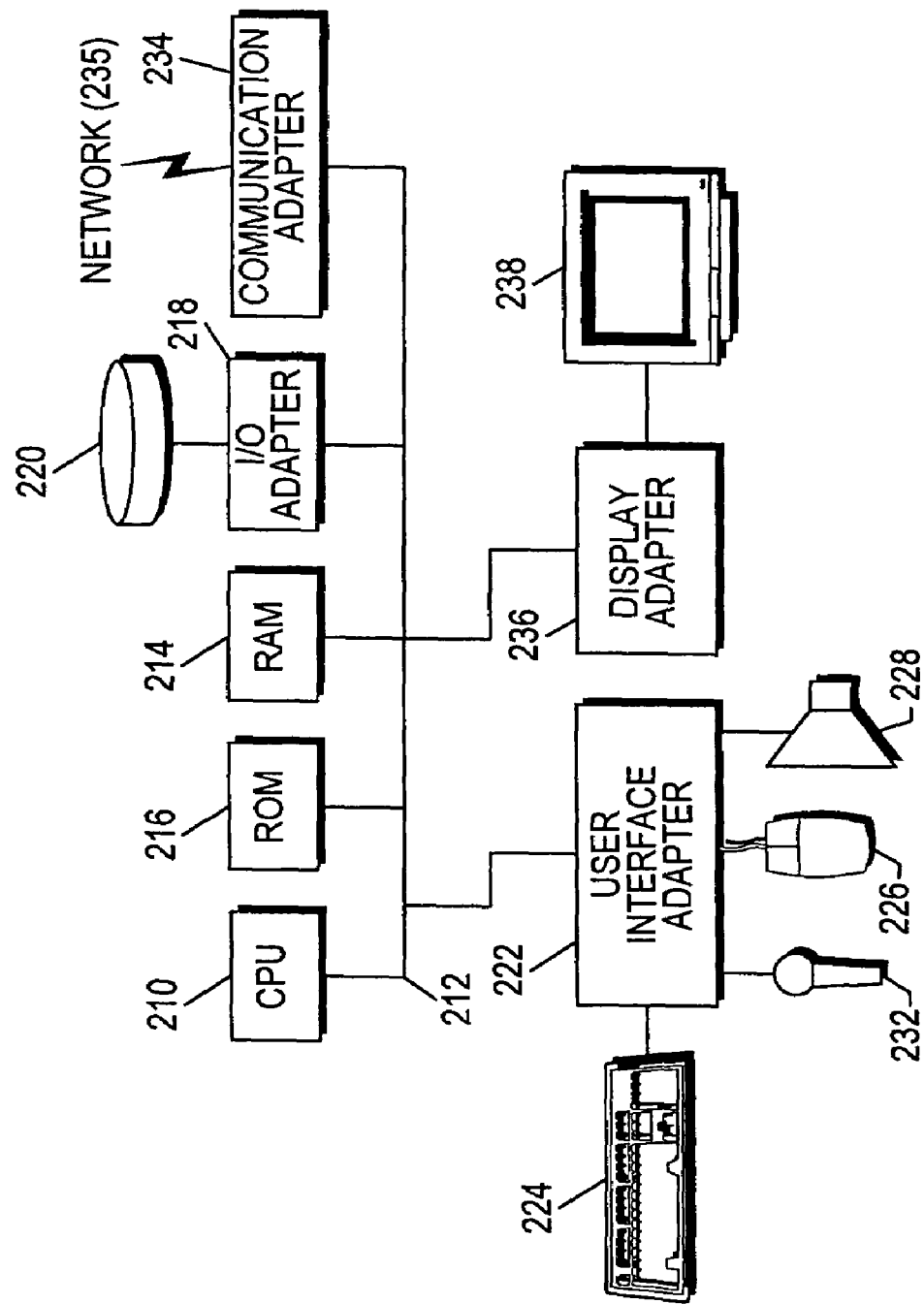
FIG. 2 is a schematic diagram of a hardware implementation of one embodiment of the present invention.

FIG. 1A illustrates an exemplary network architecture 150 for implementing the present invention. As shown, a web browser 152 is used to connect to a web server 154. The web server is connected to an application server 156 and a mainframe 158. The various components set forth in FIG. 1A may be practiced in the context of a personal computer such as an IBM compatible personal computer, Apple Macintosh computer or UNIX based workstation. A representative hardware environment is depicted in FIG. 2, which illustrates a typical hardware configuration of a workstation in accordance with a preferred embodiment having a central processing unit 210, such as a microprocessor, and a number of other units interconnected via a system bus 212. The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network (e.g., a data processing network) and a display adapter 236 for connecting the bus 212 to a display device 238. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

- Objects and their corresponding classes break down complex programming problems into many smaller, simpler problems.
- Encapsulation enforces data abstraction through the organization of data into small, independent objects that can communicate with each other.
- Encapsulation protects the data in an object from accidental damage, but allows other objects to interact with that data by calling the object's member functions and structures.
- Subclassing and inheritance make it possible to extend and modify objects through deriving new kinds of objects from the standard classes available in the system. Thus, new capabilities are created without having to start from scratch.
- Polymorphism and multiple inheritance make it possible for different programmers to mix and match characteristics of many different classes and create specialized objects that can still work with related objects in predictable ways.
- Class hierarchies and containment hierarchies provide a flexible mechanism for modeling real-world objects and the relationships among them.
- Libraries of reusable classes are useful in many situations, but they also have some limitations. For example:
- Complexity. In a complex system, the class hierarchies for related classes can become extremely confusing, with many dozens or even hundreds of classes.
- Flow of control. A program written with the aid of class libraries is still responsible for the flow of control (i.e., it must control the interactions among all the objects created from a particular library). The programmer has to decide which functions to call at what times for which kinds of objects.
- Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.
  Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.
  Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language-2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;
  Restricted user interface capabilities;
  Can only produce static Web pages;
  Lack of interoperability with existing applications and data; and
  Inability to scale.

Sun Microsystem's Java language solves many of the client-side problems by:

Improving performance on the client side;
  Enabling the creation of dynamic, real-time Web applications; and
  Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Figure 3:
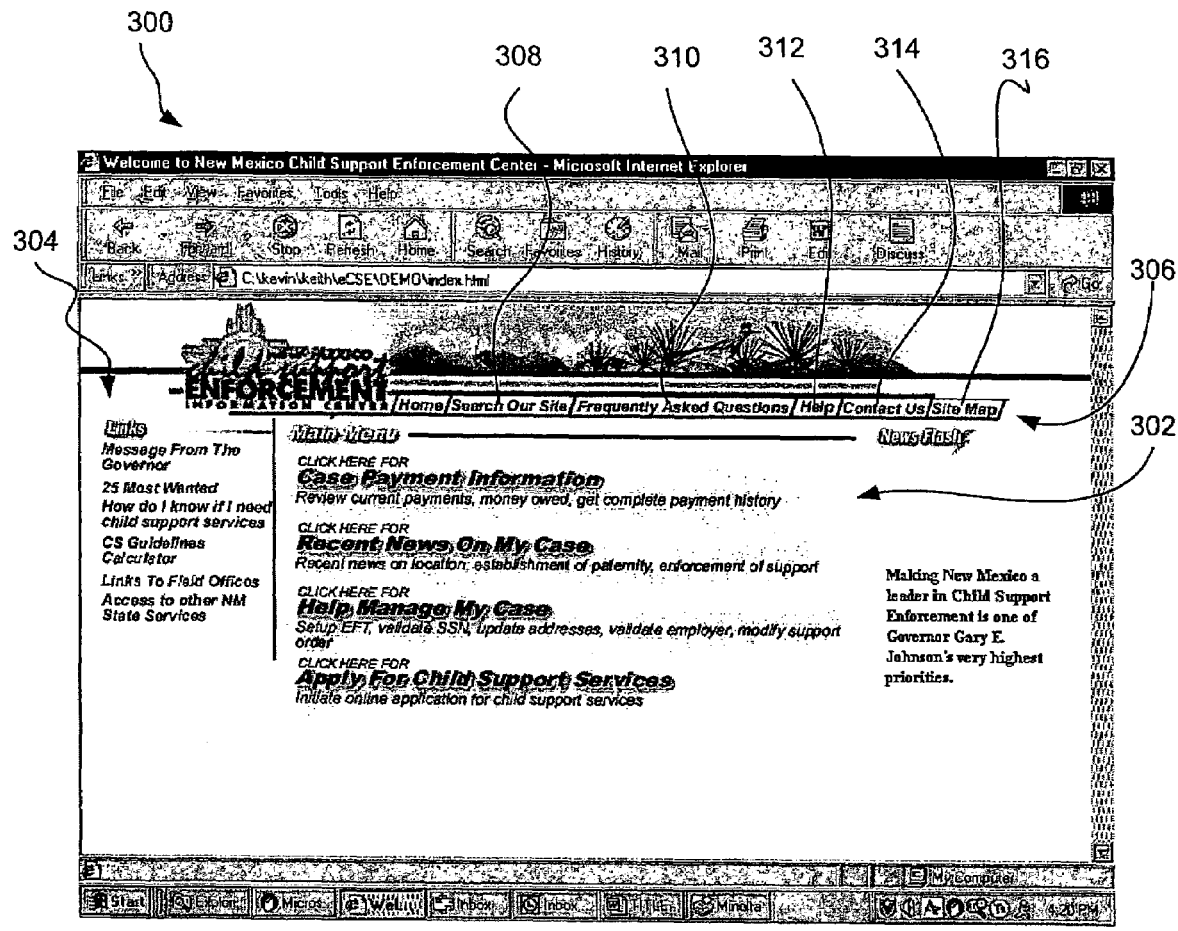
FIG. 3 illustrates a home page interface in accordance with one embodiment of the present invention.

FIG. 3 illustrates a home page interface 300 in accordance with one embodiment of the present invention. As shown, a main menu 302 is displayed, which includes links to the main services of the child support system website. One link is to a Case Payment Information page (See also FIG. 12). Another is to a news page particular to the case of the user (See also FIG. 26). Also included on the home page interface is a supplemental links menu 304 which includes links to supplemental services. A navigation bar 306, including a linked search page button 308, a button 310 linked to a Frequently Asked Questions (FAQ) page, a help button 312, a contact page button 314, and site map button 316 can also be provided to aid in navigation.

Figure 4:
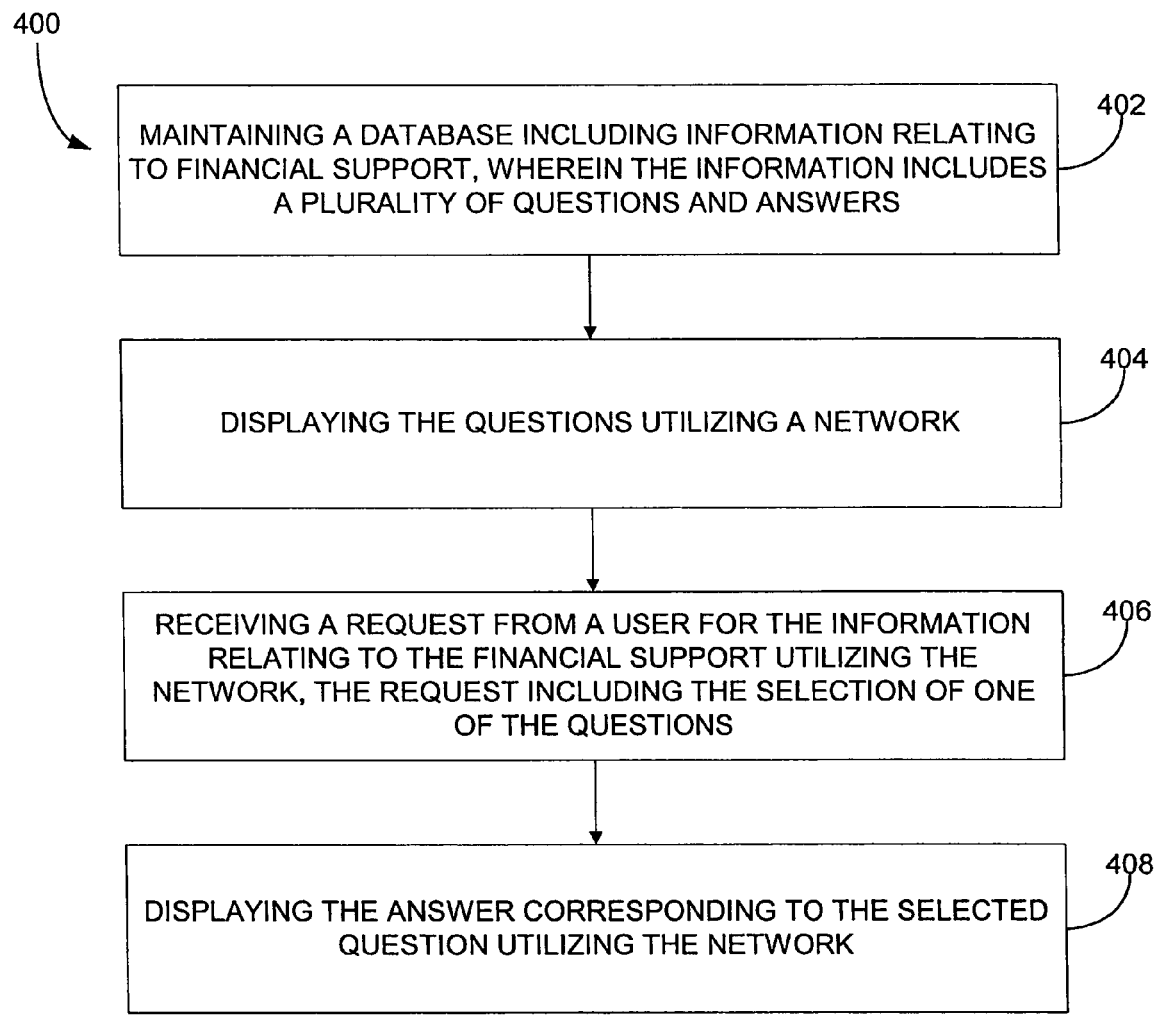
FIG. 4 is a flowchart illustrating a method for affording information services in a child support framework.

FIG. 4 is a flowchart illustrating a method 400 for affording information services in a child support framework. First, in operation 402, a database is provided including information relating to financial support. Such information includes a plurality of questions and answers. During use, the questions are displayed utilizing a network. See operation 404. Further, in operation 406, a request is received from a user for the information relating to the financial support utilizing the network. The request may include the selection of one of the questions. The answer corresponding to the selected question is then displayed utilizing the network. See operation 408.

In one embodiment of the present invention, the user may be linked to another site on the network including information on financial support field offices. As an option, the information may relate to services provided by a governmental financial support organization. Further, the information may relate to an eligibility for the services provided by the governmental financial support organization, or identify financial support violators.

Figure 5:
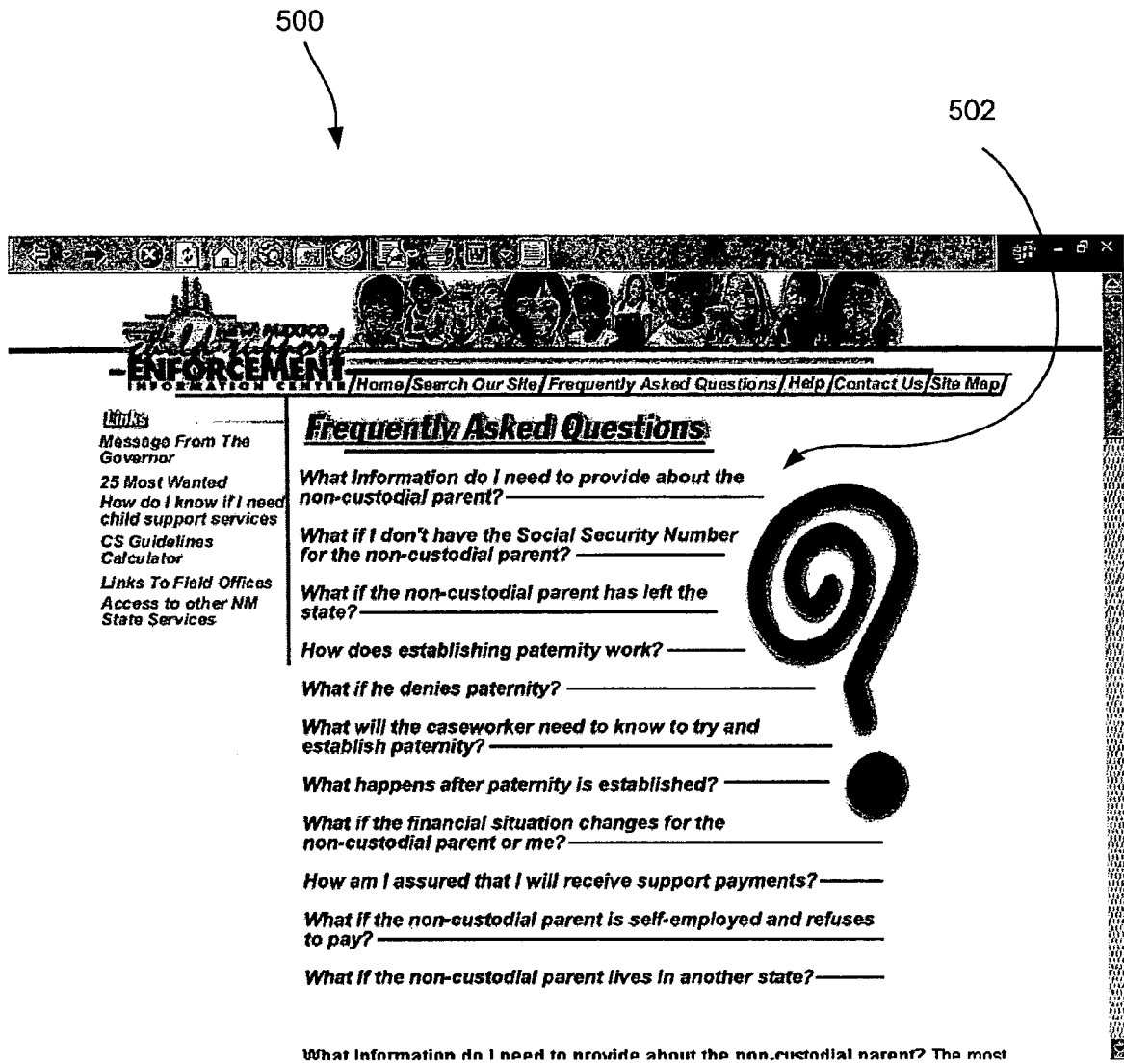
FIG. 5 is a graphical user interface illustrating the frequently asked questions associated with the information services of FIG. 4.

FIG. 5 is a graphical user interface 500 illustrating the frequently asked questions associated with the information services of FIG. 4 and displayed upon selection of the FAQ button on the home page. As shown, popular questions 502 which can be readily answered online are provided. Each question is linked to an answer section of the same page or another page, where the answer to the question is displayed. Preferably, some of the questions and answers are directed towards preparing a user for a telephone or in-person interview with a case worker who will be assisting in the child support case.

Figure 6:
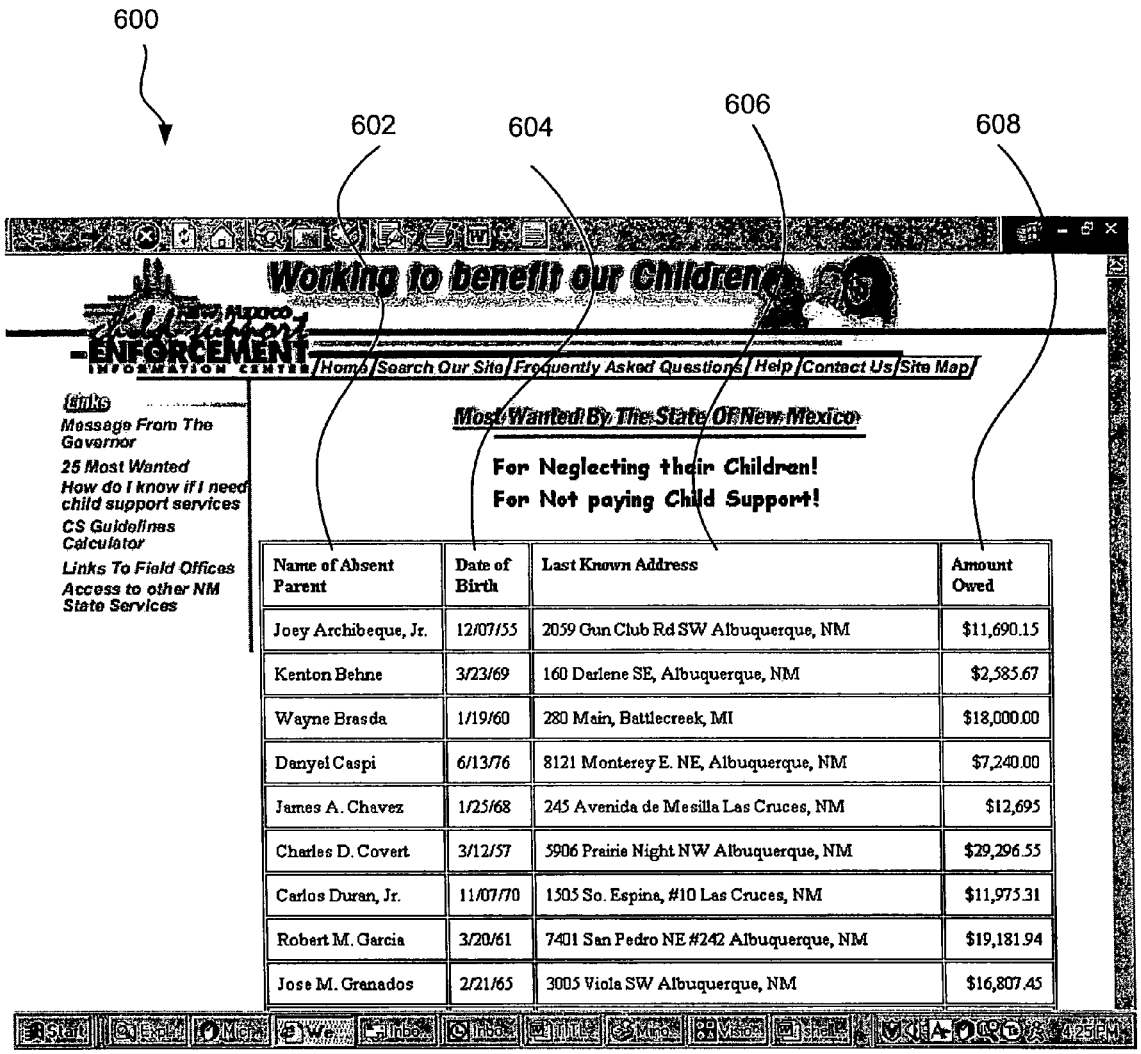
FIG. 6 is a graphical user interface illustrating the financial support violators associated with the information services of FIG. 4.

FIG. 6 is a graphical user interface illustrating the financial support violators which is displayed upon selection of a most wanted link in the supplemental link menu of the home page interface shown in FIG. 4. As shown, a first column 602 displays names of the absent parents, while second, third and fourth columns 604,606,608 display the absent parents' date of birth, last known address, and an amount of unpaid child support.

Figure 7:
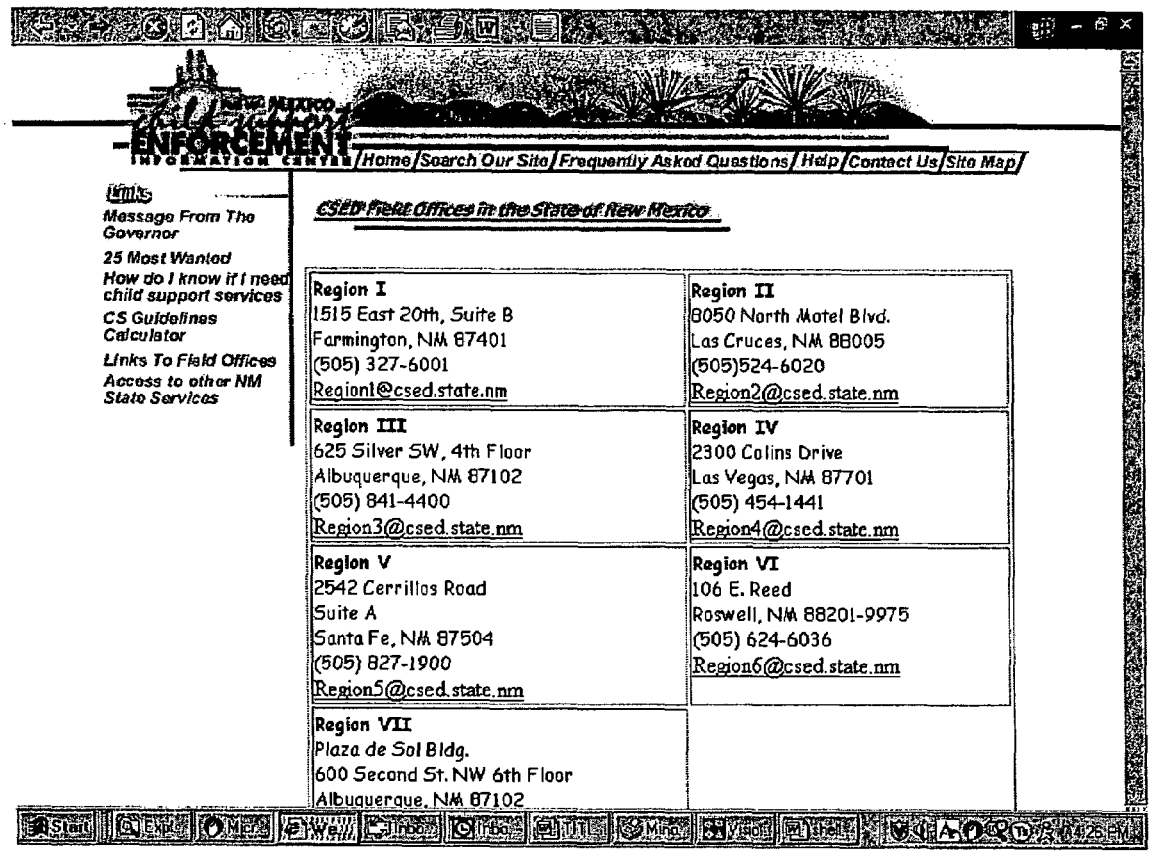
FIG. 7 is a graphical user interface illustrating the field office links associated with the information services of FIG. 4.

FIG. 7 is a graphical user interface 700 illustrating the field office links associated with the information services of FIG. 4 and displayed upon selection of a field office link in the supplemental link menu. As shown, addresses, telephone numbers and email addresses are provided for each of the field offices in the state.

Figure 8:
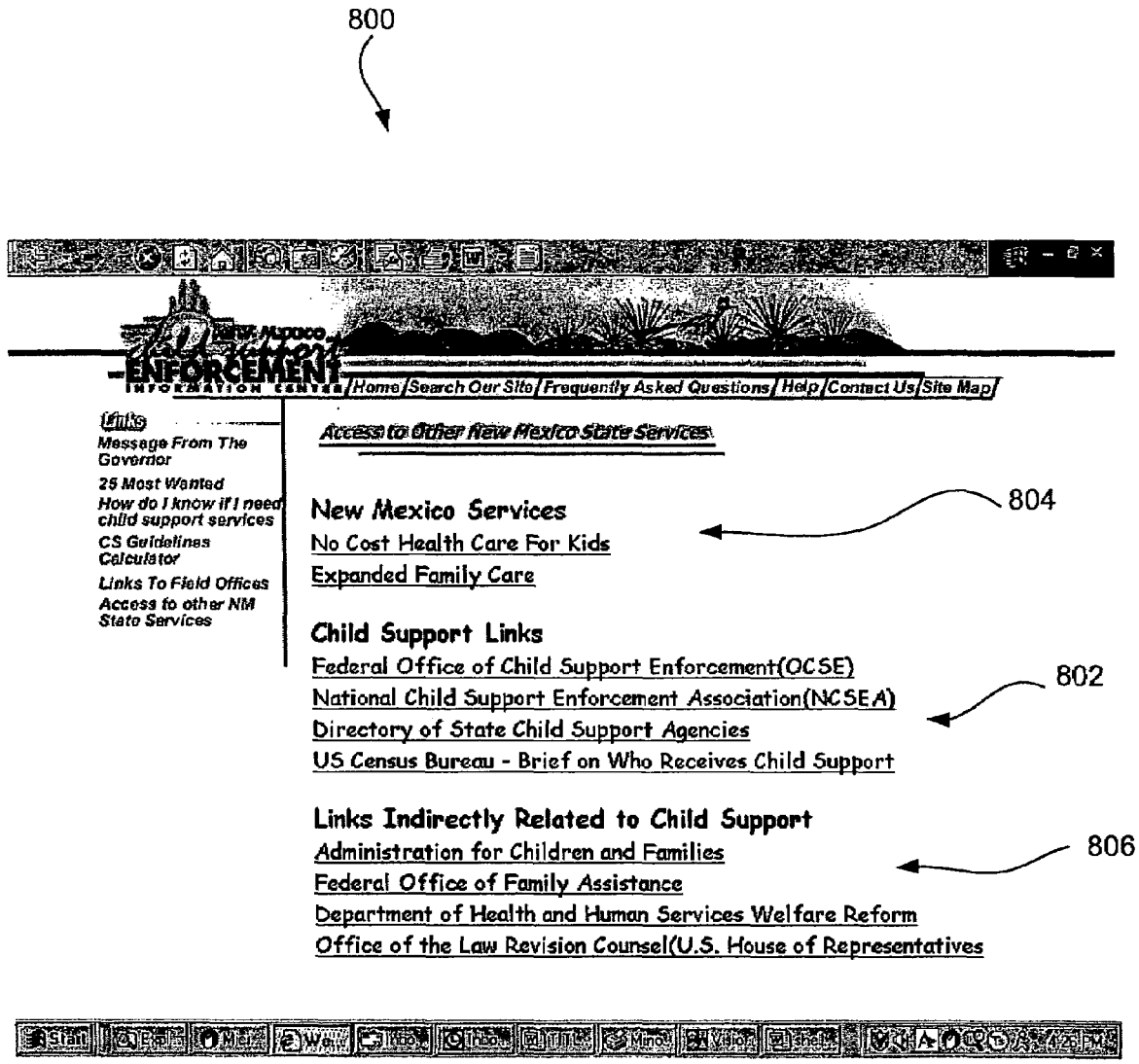
FIG. 8 is a graphical user interface illustrating other services associated with the information services of FIG. 4.

FIG. 8 is a graphical user interface 800 illustrating other services associated with the information services of FIG. 4. As shown, links to related sites are provided. Such links can include links 802 directly related to child support and links 804,806 indirectly related to child support.

Figure 9:
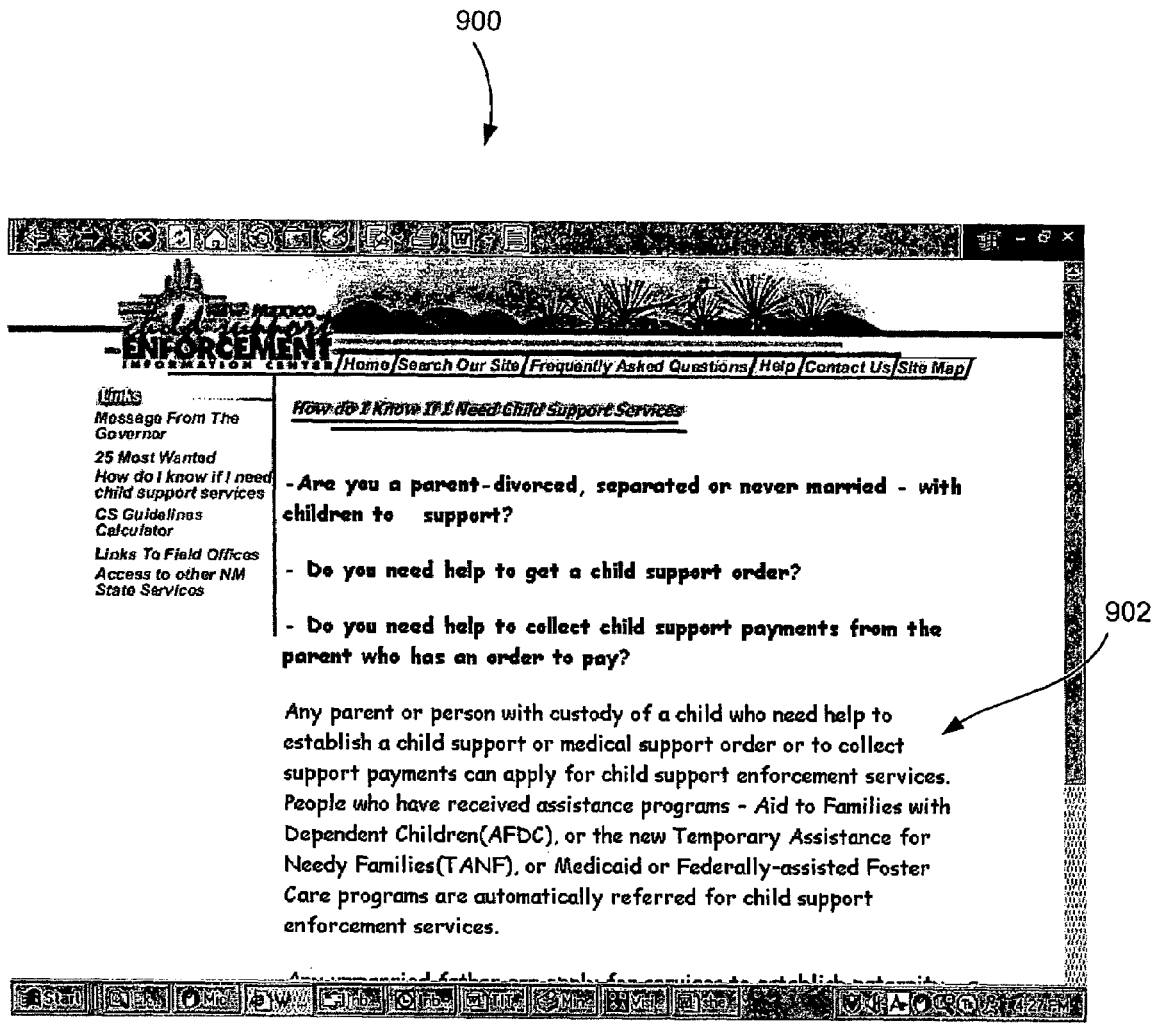
FIG. 9 is a graphical user interface illustrating the eligibility requirements associated with the receiving financial support of FIG. 4.

FIG. 9 is a graphical user interface 900 illustrating a screen that displays the eligibility requirements 902 associated with receiving financial support.

Figure 10:
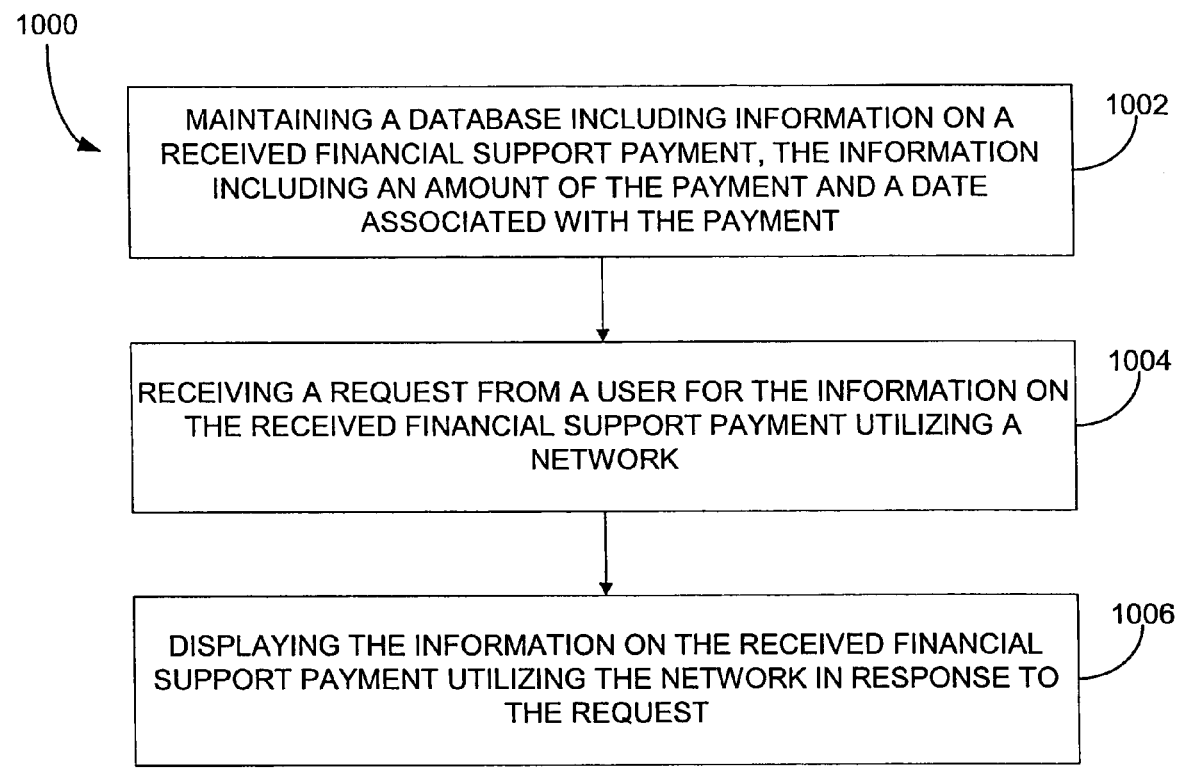
FIG. 10 is a flowchart illustrating a method for affording a financial support payment status.

FIG. 10 is a flowchart illustrating a method 1000 for affording a financial support payment status. First, in operation 1002, a database is established including information on a received financial support payment. The information may include an amount of the payment and a date associated with the payment. During use, a request is received from a user for the information on the received financial support payment utilizing a network. See operation 1004. In response to the request, the information on the received financial support payment is displayed utilizing the network. Note operation 1006.

In one embodiment of the present invention, the date may include a date when the payment was received. Further, the date may include a date when the payment was sent to the user. An amount of time required for the received financial support payment to be available for withdrawal may also be displayed. In another embodiment of the present invention, the information may include a case number associated with the received financial support payment.

Figure 11:
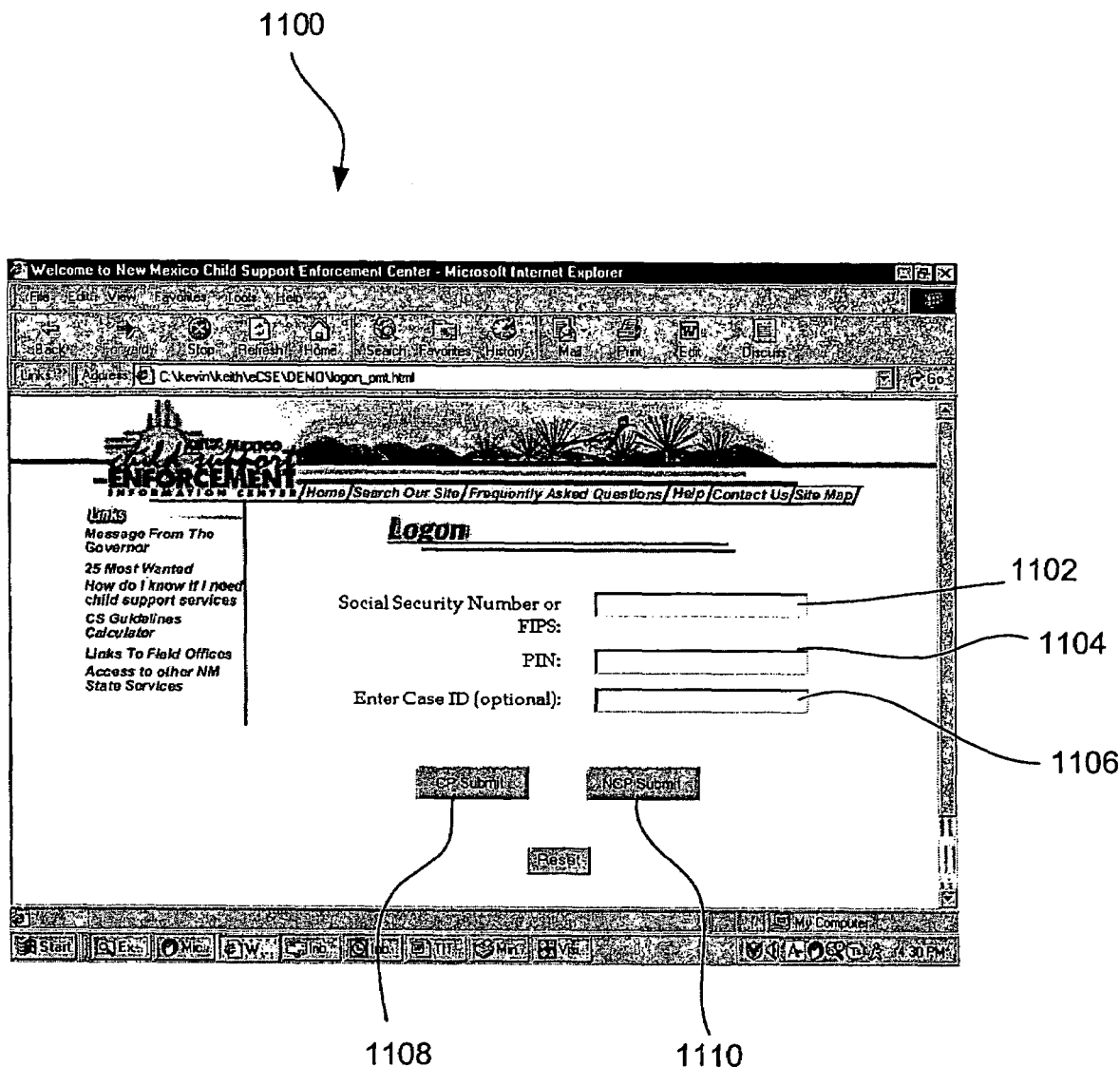
FIG. 11 is a log-in graphical user interface that may be required for execution of the method of FIG. 10.

FIG. 11 is a graphical user interface 1100 displaying log-in fields 1102,1104,1106 that may be required to be filled with user-specific information for execution of the method of FIG. 10. The log-in screen restricts access to sensitive information such as case specifics, payment logs, payment forms, etc. A user identification number is placed in field 1102 and a personal identification number is placed in field 1104 to verify authorization. The user then selects the CP submit button 1108 if the user is the Custodial Parent (CP) or the NCP submit button 1110 if the user is the Non-Custodial Parent (NCP) gain access to the protected information.

Figure 12:
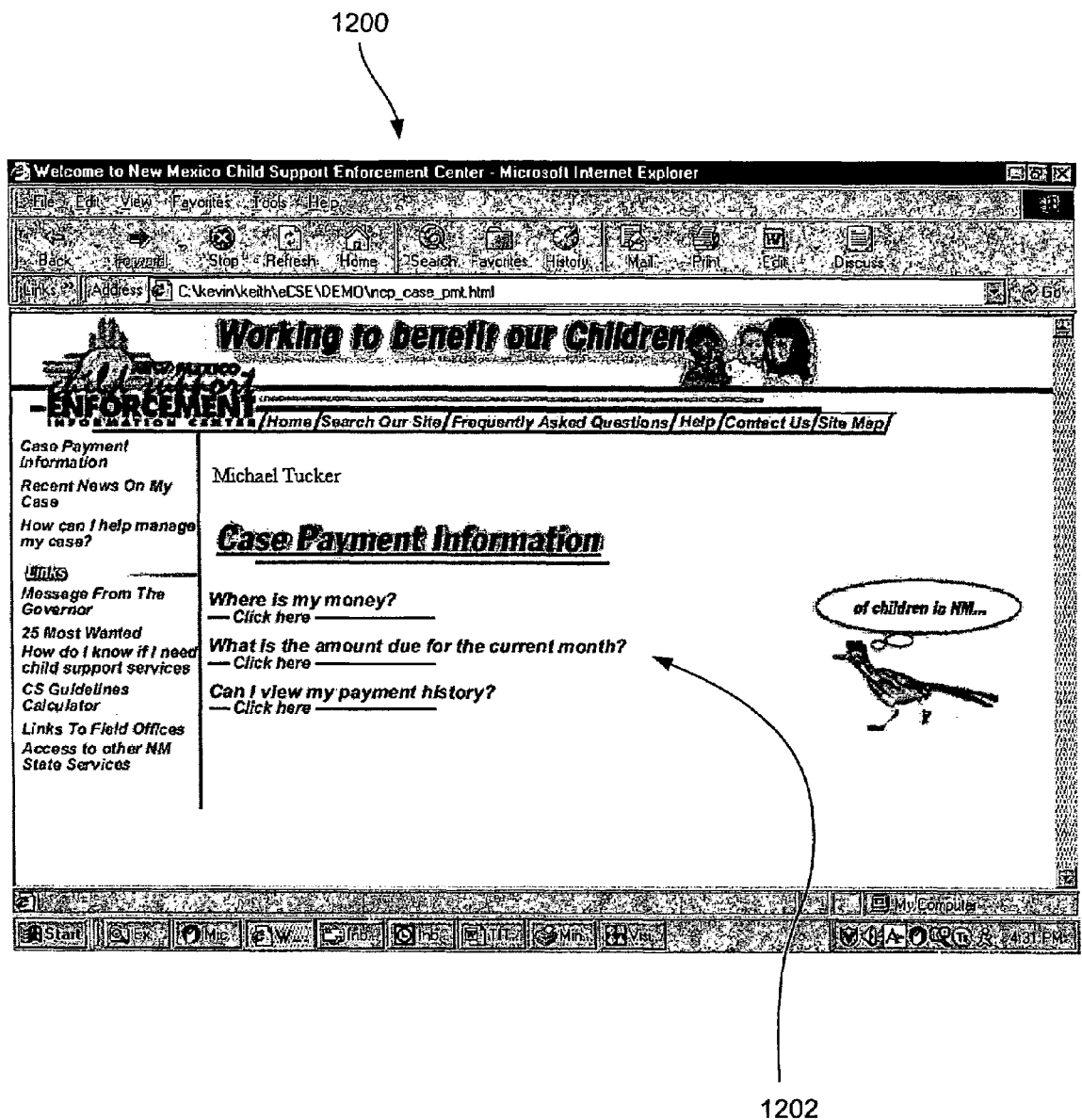
FIG. 12 is a graphical user interface that allows access to various types of status information in accordance with the method of FIG. 10.

FIG. 12 is a graphical user interface 1200 that allows access to various types of status information in accordance with the method of FIG. 10. As shown, links 1202 to case payment information are displayed. Selection of the various links bring up screens displaying a current status of a payment, an amount due for a payment period, and a payment history.

Figure 13:
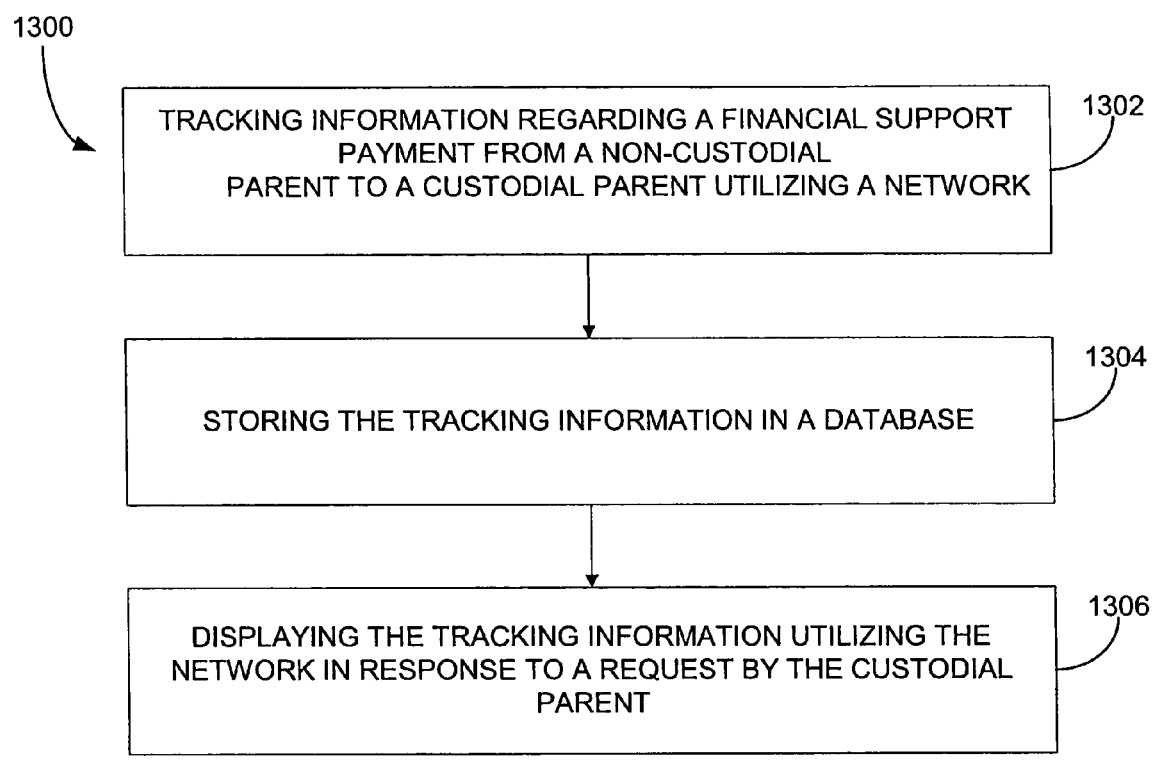
FIG. 13 is a flowchart illustrating a method for providing a payment history of a financial support payment.

FIG. 13 is a flowchart illustrating a method 1300 for providing a payment history of a financial support payment. Information regarding a financial support payment from a non-custodial parent to a custodial parent is tracked utilizing a network. Note operation 1302. Then the tracking information is stored in a database in operation 1304. The tracking information is subsequently stored utilizing the network in response to a request by the custodial parent. See operation 1306.

In an aspect of the invention, the tracking information can take the form of a chart. In another aspect of the invention the tracking information can be selected from the group consisting of a date, an amount received on the date, an amount retained of the amount received, and a disbursement of the amount received to the custodial parent. In still another aspect of the invention, the network includes the Internet. In still yet another aspect of the invention, the tracking information is displayed only after a user logs in.

FIG. 14 is a graphical user interface 1400 that conveys the payment history information in accordance with the method of FIG. 13. As shown, the date each payment received is displayed along with the amount received. The amount retained and the amount disbursed to the Custodial Parent is also displayed.

Figure 15:
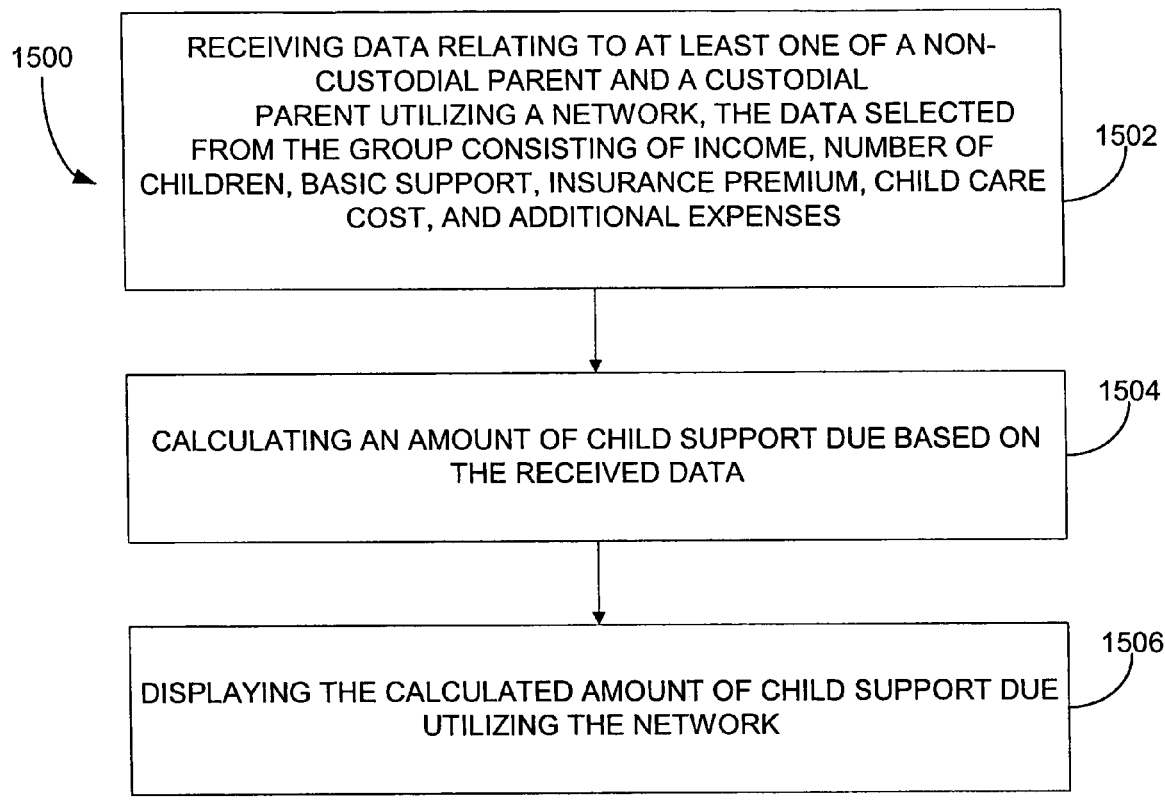
FIG. 15 is a flowchart of a method for calculating an amount of child support.
Figure 18:
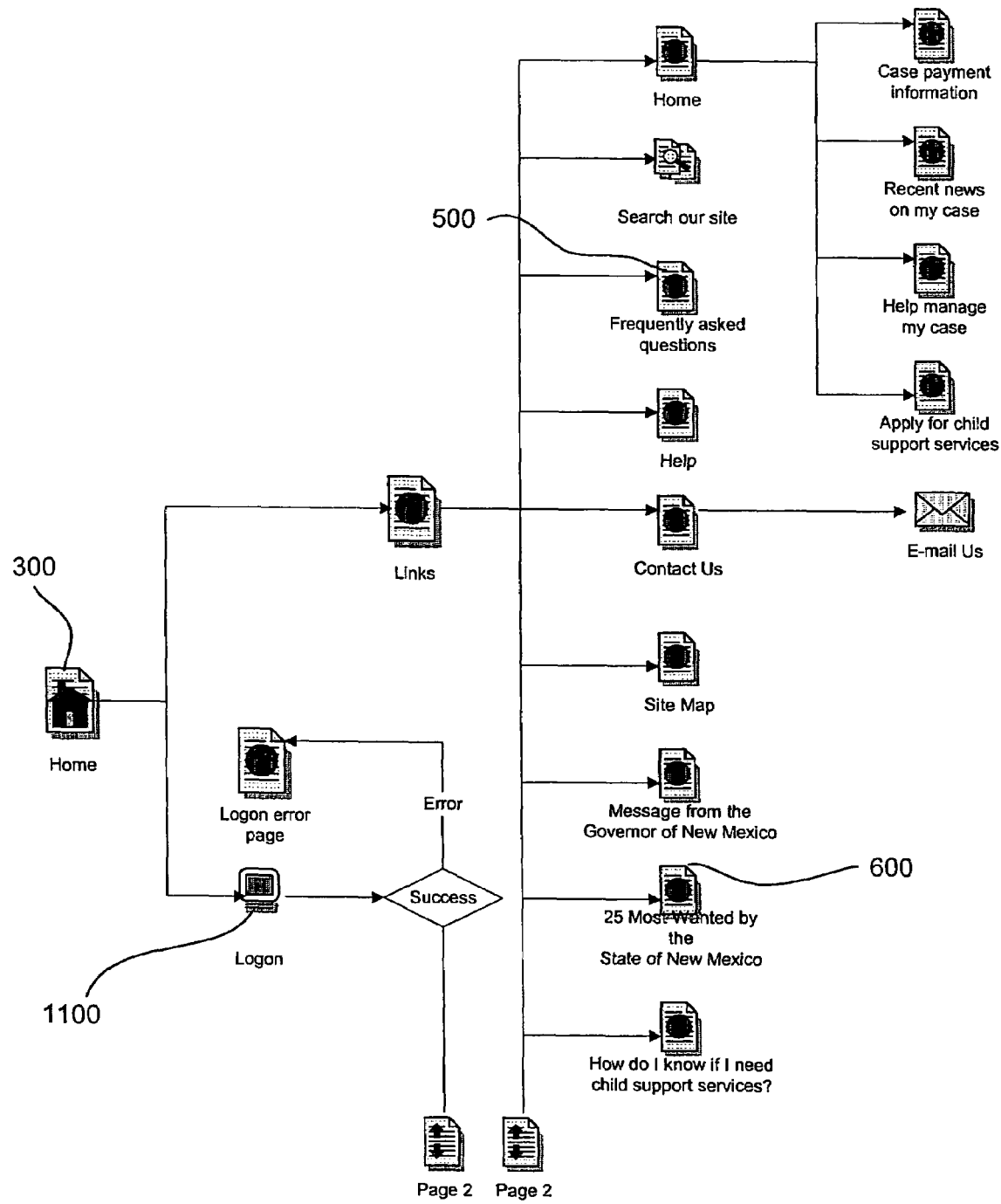
Figure 19:
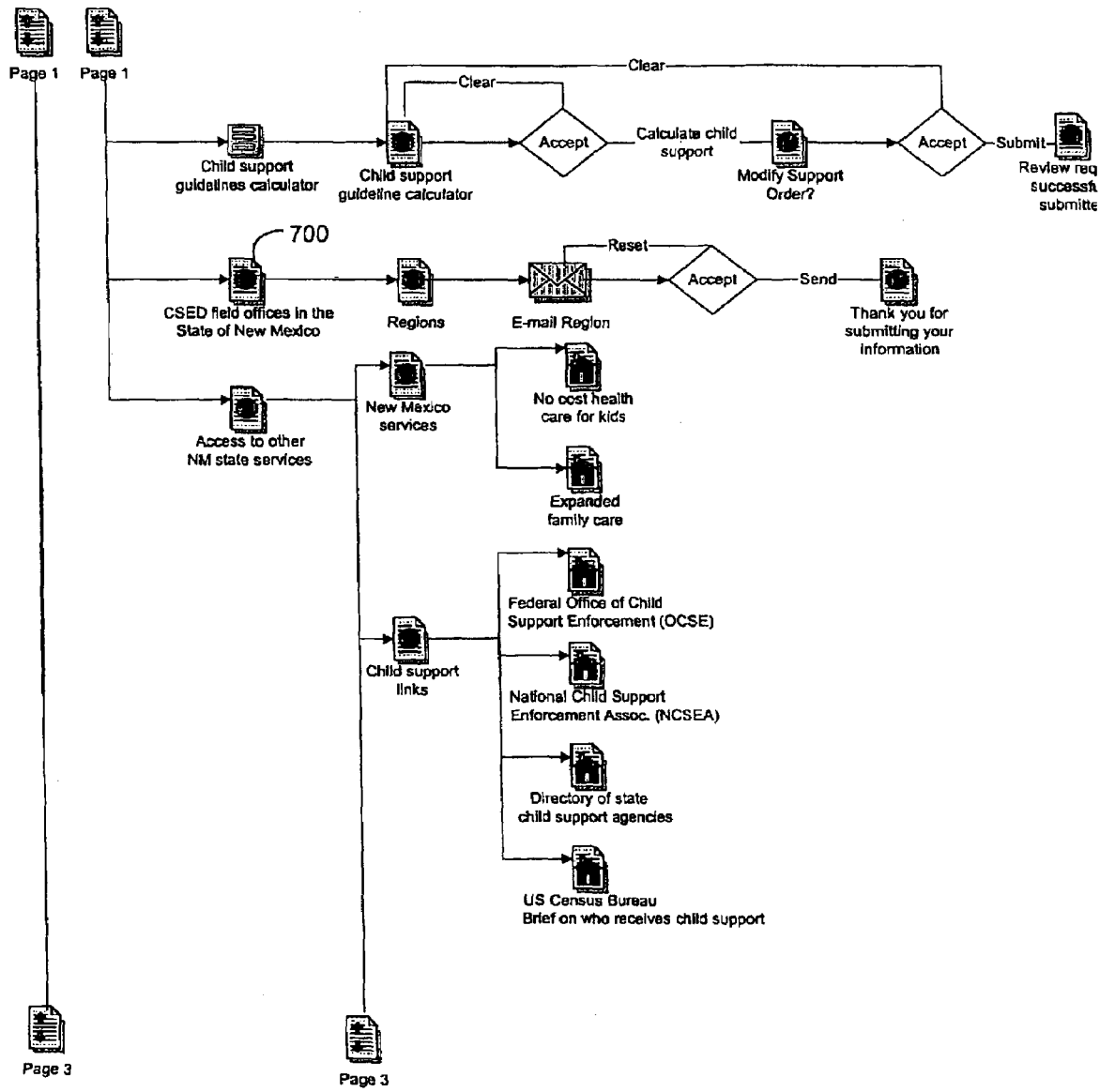
Figure 20:
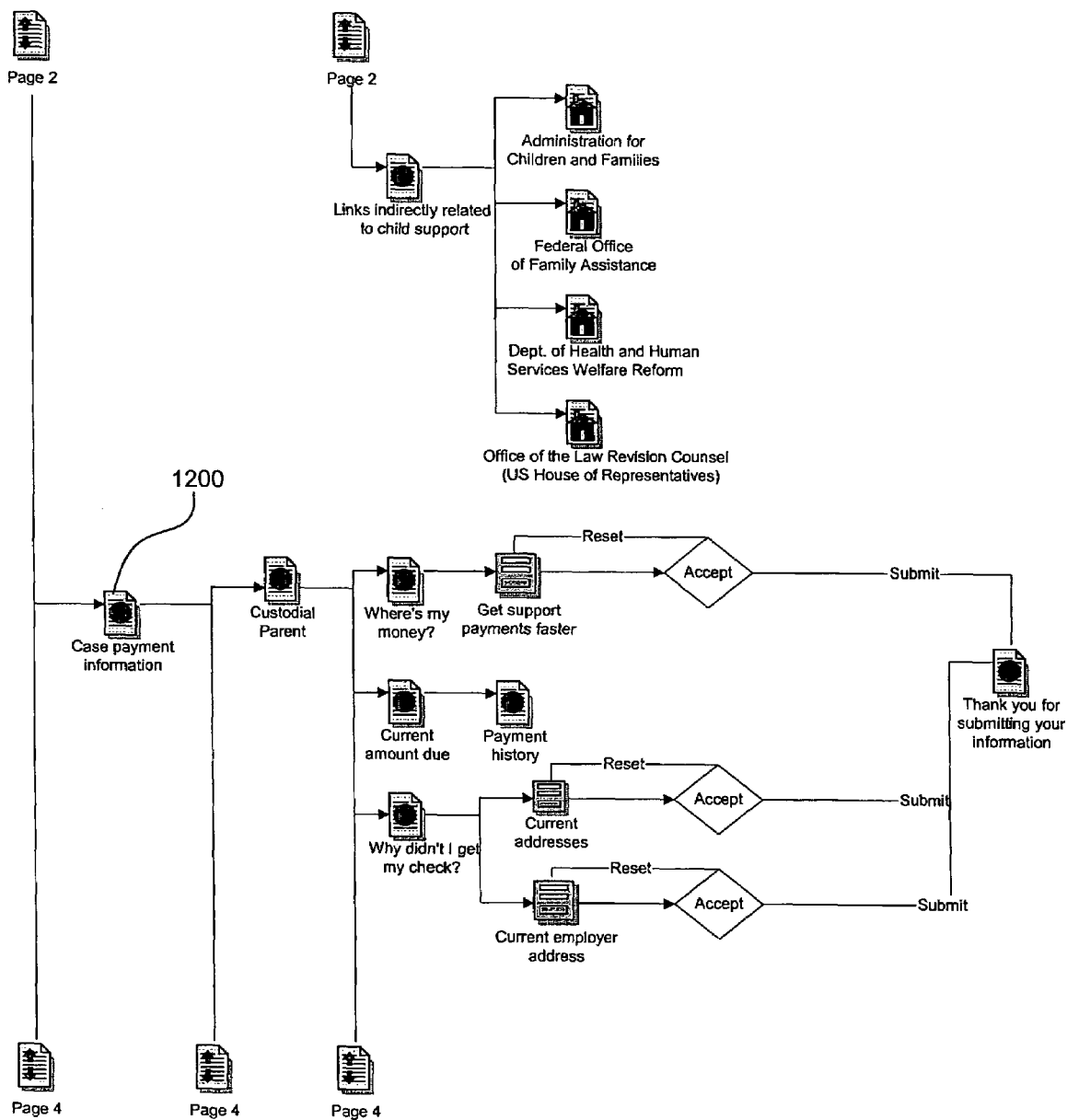
Figure 21:
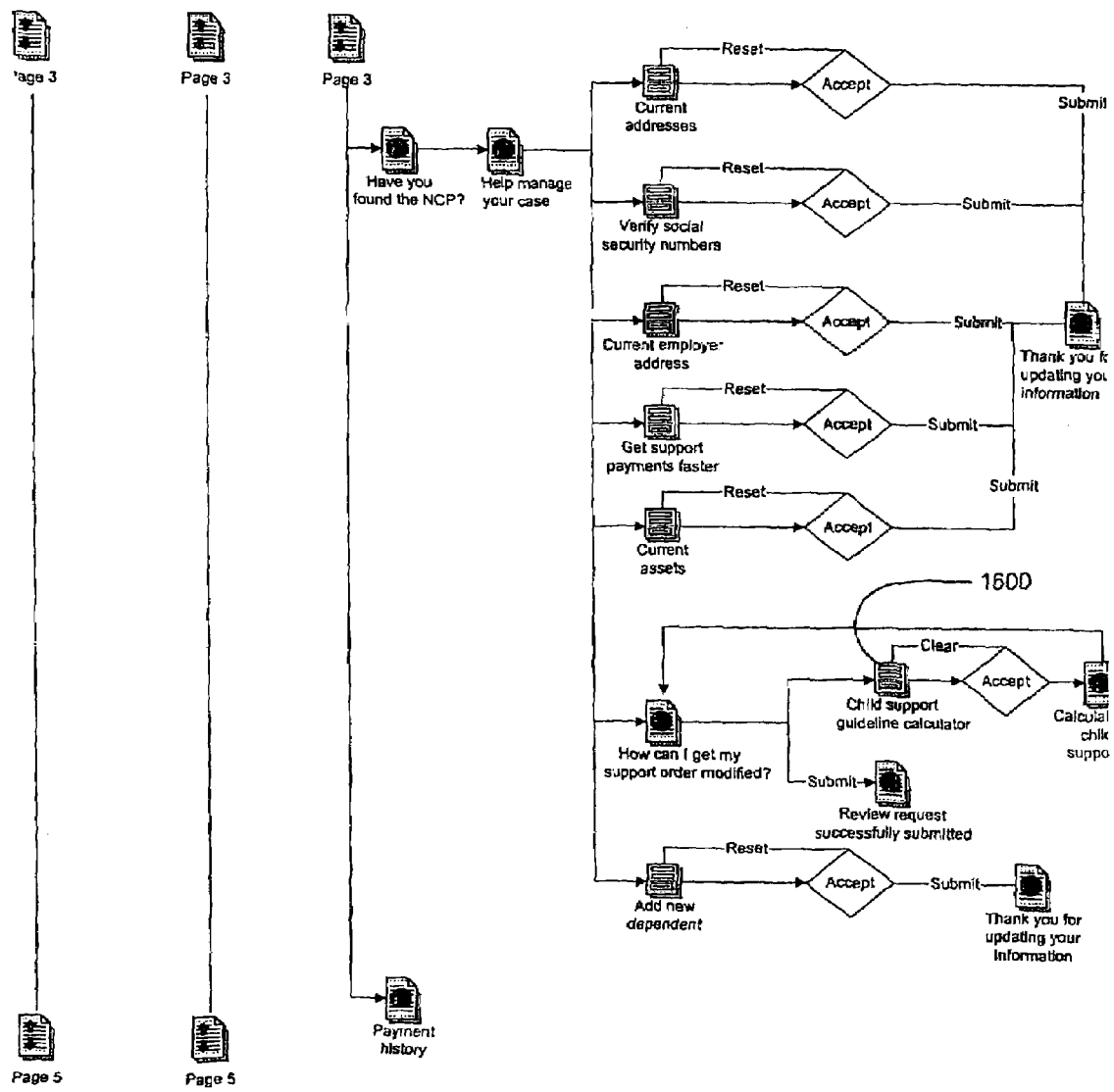
Figure 22:
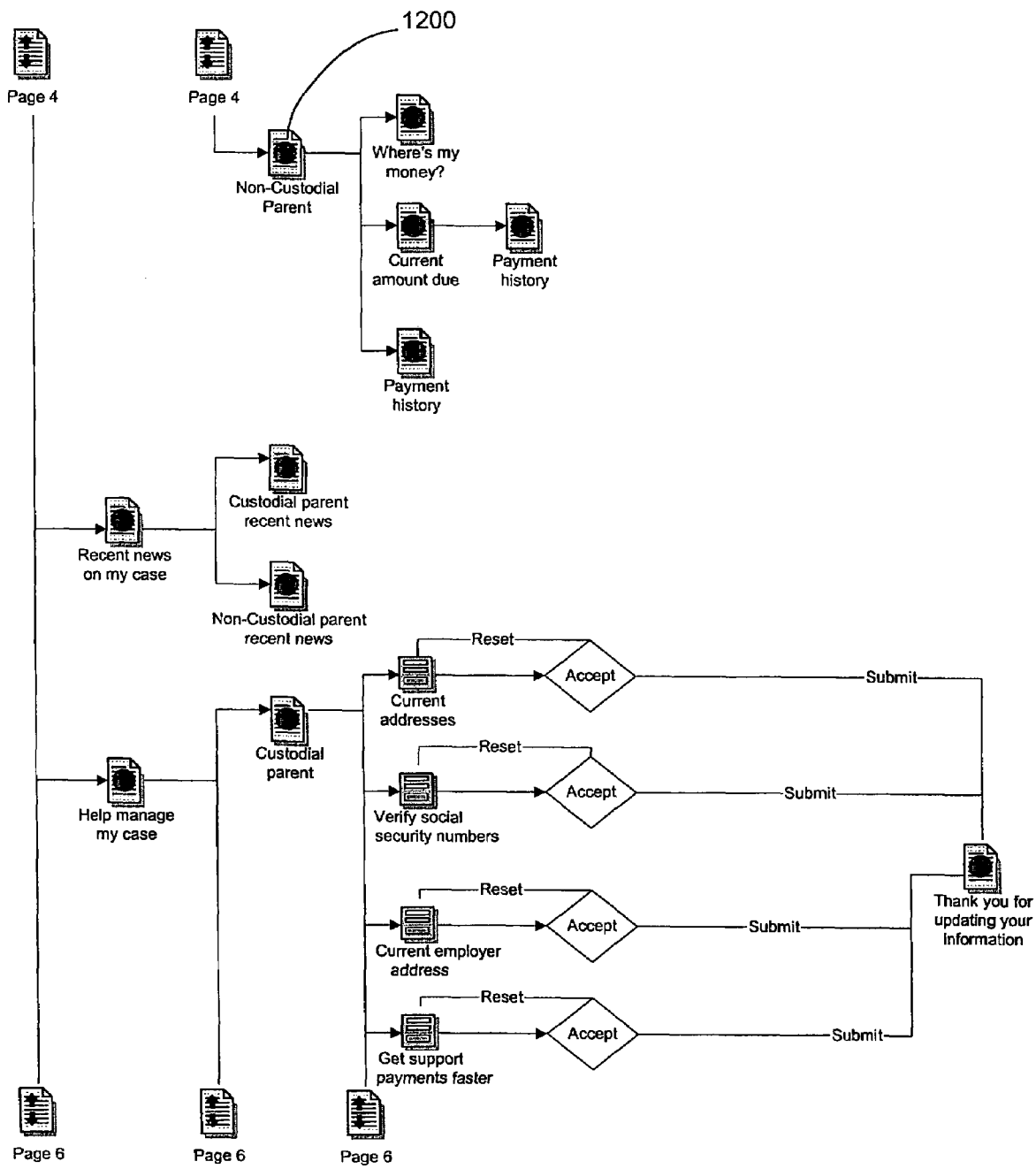
Figure 23:
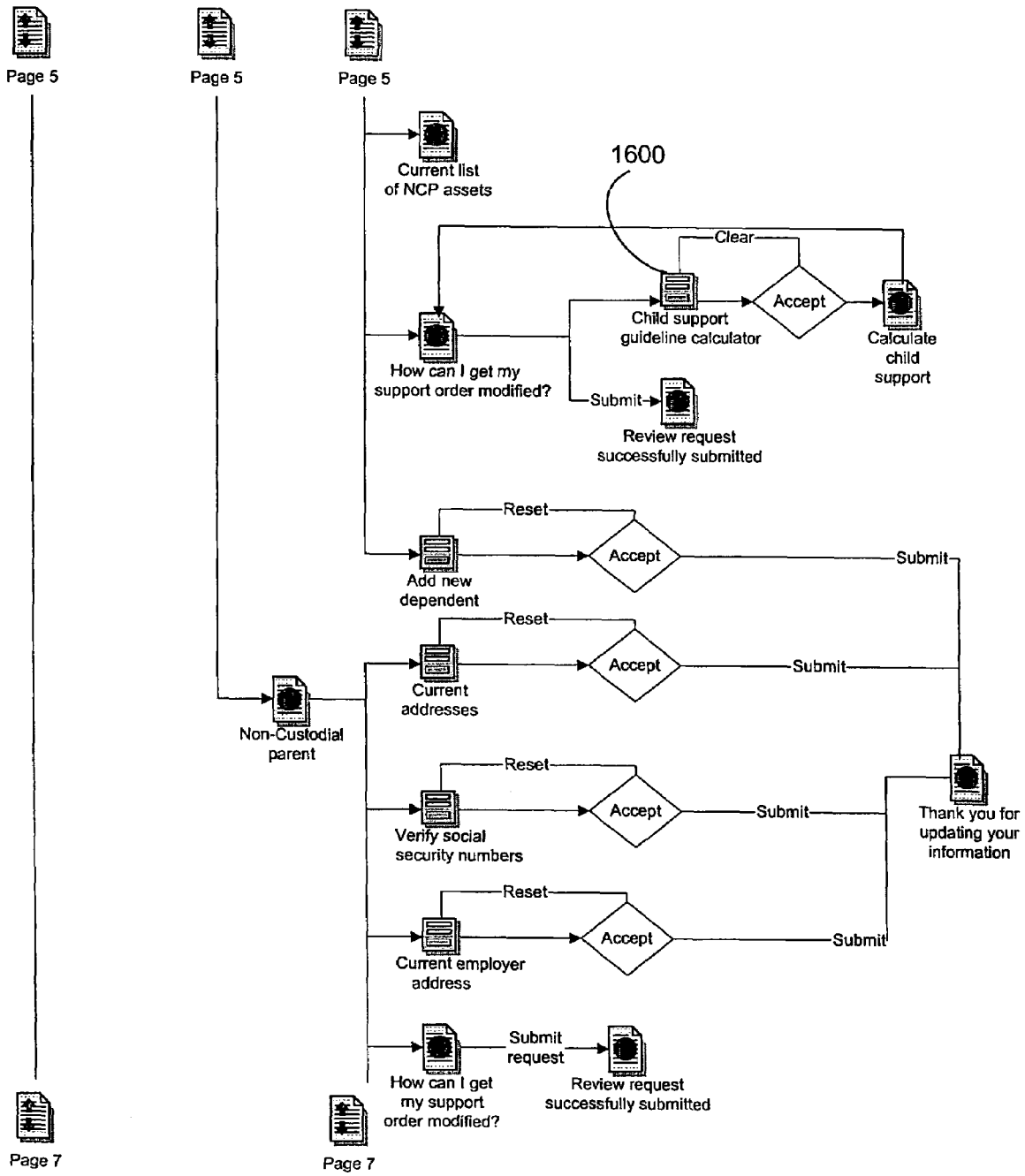

FIG. 15 is a flowchart of a method 1500 for calculating an amount of child support. First, in operation 1502, data is received relating to at least one of a non-custodial parent and a custodial parent utilizing a network. The data may include income, number of children, basic support, insurance premium, child care cost, and/or additional expenses. During use, an amount of child support due based on the received data in operation 1504. Such calculated amount of child support due is displayed utilizing the network, as indicated in operation 1506.

In one embodiment of the present invention, the data may be received by allowing a user to fill in a plurality of fields on a chart. Further, a user may be permitted to change a profile thereof in response to the display of the calculated amount of child support due. Still yet, the data may indicate whether a father or a mother is the custodial parent.

FIG. 16 is a graphical user interface 1600 that executes the calculator function in accordance with the method of FIG. 15. The calculator function is used to calculate an estimated amount of child support due per period of time. As shown, the gross monthly incomes of both the CP and the NCP are entered in the gross monthly income fields 1602. A basic child care amount is entered in the basic support field 1604. Additional fields are provided to submit additional child care expenses. Upon entering the information, the Calculate Child Support button 1606 is selected to begin calculation. The approximate amount of child support is displayed on a results screen (not shown).

FIG. 17 is a summary 1700 of a proposed site map associated with the present invention.

FIGS. 18-24 show flow diagrams illustrating possible navigation routes the user can take during use of the present invention.

Most Wanted Page

This section describes the general design for the 25 Most Wanted Page for an electronic Child Support Enforcement Web Application (eCSE). This is achieved by providing an overview of the system's various infrastructure components and their interdependencies.

Objectives

The main objectives of this section is to:
Provide an overview of the all components and their dependencies of the 25 Most Wanted Page.
Describe the 25 Most Wanted Page infrastructure objects in sufficient detail to support their build.
Act as a reference guide for the 25 Most Wanted Page infrastructure objects.

General Design Requirements

The eCSE 25 most wanted web page is designed to include the functionality required perform the following:
View the 25 Most Wanted Non-Custodial Parents online.

25 Most Wanted Components

Description

An Internet user using a certified web browser will request data from an HTML page.

Data will be retrieved from the SQL7 Server through the ICBAM Architecture. The ICBAM Architecture was built using Microsoft Object Component Technologies (COM).

Data will pass through the business logic using the page controller (COM) component to/from the Active Server Pages.

Active server pages will be used to display the top 25 most wanted non-Custodial parents who haven't pay their child support sorted from the highest outstanding balance to the lowest. Any errors encountered during the data retrieval will be documented in a server error log.

Data Input Sources

There are no user inputs required for the 25 Most Wanted Page. However, when user clicks on the 25 Most Wanted Link from the side menu to access the page, the page will retrieve the 25 Most Wanted data and display back to the user on the web page.

Data Security

No security user logon is required.

Infrastructure Components

Figure 25:
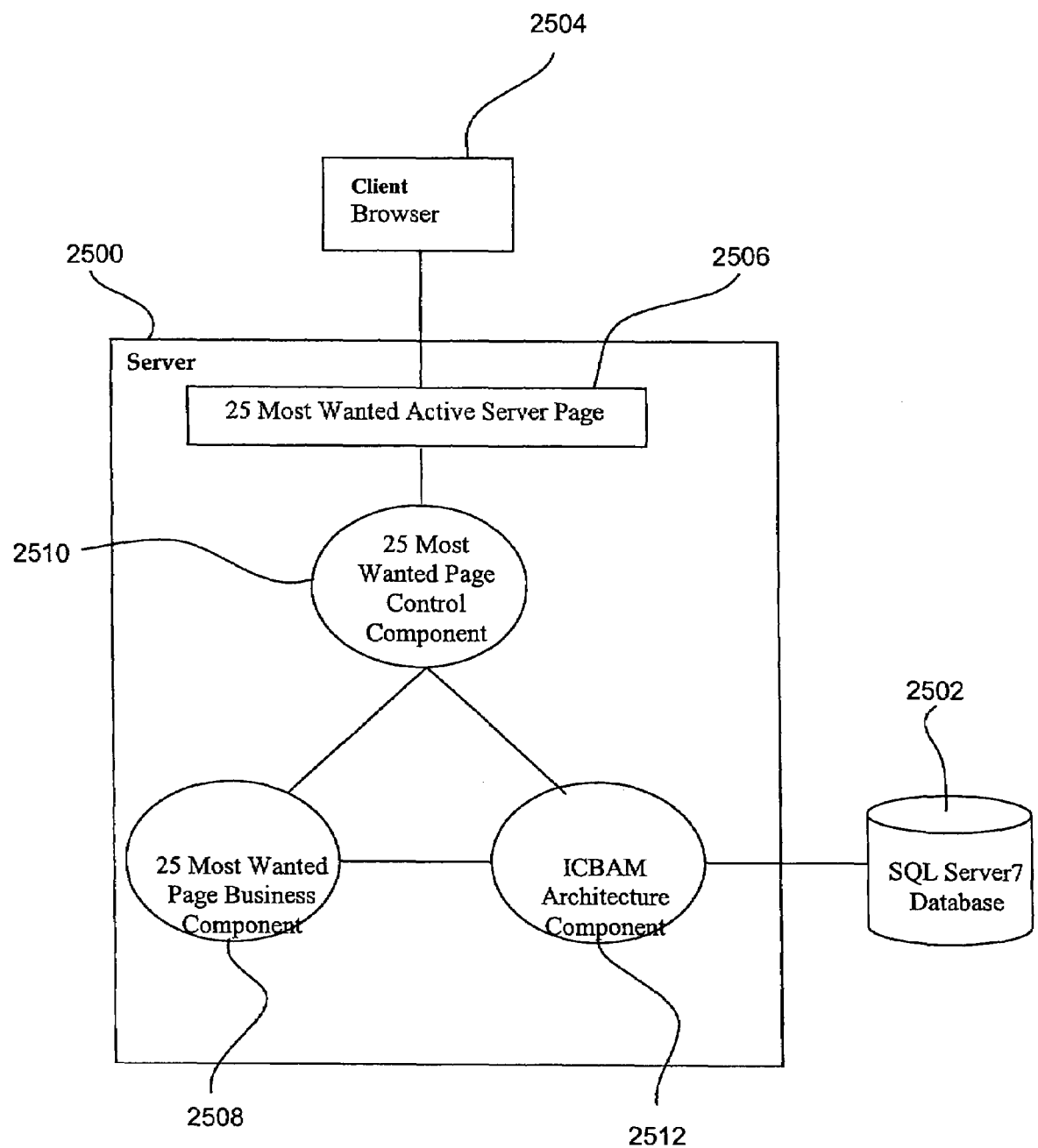
FIG. 25 illustrates the components of the "25 Most Wanted" Infrastructure.

FIG. 25 illustrates the components of the "25 Most Wanted" Infrastructure. The infrastructure is comprised of the following components:

SQL7 Data Repository on Web Server 2500. An established area on the State web server where all files to be used by the eCSE SQL7 data warehouse will be deposited.

Server Microsoft SQL7 Data Warehouse 2502. A robust relational database containing tables with data necessary to encompass the functionality of the current State Child Support Enforcement system monthly process.

Client Web Browser Graphical User Interface 2504. The client web based front-end of the application in Hyper Text Markup Language (HTML) which a client (user) will use to enter new data from the client's web browser into the appropriate sql server tables and generate requested results back to the client web browser.

25 Most Wanted Active Server Page (ASP) 2506. The client web based front-end of the application in Hyper Text Markup Language (HTML) calls on the 25 Most Wanted Active Server Page to display a list back to the client browser of the top 25 non-custodial parents who has the highest outstanding child support payments to date. The 25 Most Wanted active server page should contain the following:
Little logic except to interact with the 25 Most Wanted Page Controller.
HTML code to display the results.
Client side scripting for common tasks such as formatting, validation, etc.

25 Most Wanted Business Component 2508. The 25 Most Wanted Business Component defines all of the public interfaces for the 25 most wanted business related components. It is responsible for all the data access to the SQL7 Server Database related to the 25 most wanted data. In addition, the 25 Most Wanted business component will contain the following:
Majority of the business logic related to 25 most wanted page.
Implementation of all the well defined interfaces.
Calls of all backend Application Programmable Interfaces (API) if necessary.
A Microsoft Transaction Server (MTS) Component.
Implementation of a declarative and/or programmatic security if necessary.

The output result will display a list of the top 25 non-custodial parents who have the highest outstanding child support payments to date back to the client's web browser.

25 Most Wanted Page Controller 2510. The 25 Most Wanted page controller is a Microsoft Transaction Server (MTS) component that will provide a standard way of transporting data to and from the 25 Most Wanted Active Server Page through dictionary objects. It implements business logic that would otherwise reside in the 25 most wanted active server page. It is the co-ordinator between the interactions of the 25 Most Wanted ASP and the 25 Most Wanted Business Components. In addition, the 25 Most Wanted Page Controller will interface with the Internet Information Server event handlers.

ICBAM Architecture Component 2512. The Internet Component Based Architecture Model (ICBAM) component that will provide a the following common architecture services:
- Error handling
- Logging Services
- Database Access
- ID Generation
- Security Service
- Registry Service
- Text Service
- State Maintenance Data Validation Checks The architecture component has error handling routines that ensure data integrity when retrieving data.

Required Output

Name of Absent Parent, Date of Birth, Last Known Address and the Amount Owed will be displayed from the 25 Most Wanted Active Server Page. The data is viewable online and printable.

Recent News on Case Display Page

This portion describes the general design for the Recent News on Case Display Page for the electronic Child Support Enforcement Web Application (eCSE). This is achieved by providing an overview of the system's various infrastructure components and their interdependencies.

Objectives

The main objectives of this section are to:
- Provide an overview of the all components and their dependencies of the Recent News on Case Page.
- Describe the Recent News on Case Page infrastructure objects in sufficient detail to support their build.
- Act as a reference guide for the Recent News on Case display Page infrastructure objects.

General Design Requirements

The eCSE Recent News on Case web page is designed to include the functionality required perform the following:
- View the Recent News on Case web page online.

Recent News on Case Display Components

Description

Custodial Parent will click the Recent News on Case link from the Home Page using a certified web browser.

Custodial Parent must logon to their case account using the Logon Page.

Data will be requested from an HTML page by Custodial Parent's Case Number Link.

Data will be retrieved from the SQL7 Server through the ICBAM Architecture. The ICBAM Architecture was built using Microsoft Object Component Technologies (COM).

Data will pass through the business logic using the page controller (COM) component to/from the Active Server Pages.

Active server pages will be used to display information the Recent News on Case as of current date. This includes any developments that occur throughout the child support process. Any errors encountered during the data retrieval will be documented in a server error log using the ICBAM Architecture.

Data Input Sources

There are no user inputs required for the Recent News on Case Page. However, when Custodial Parent user clicks on the URL to access the page, the page will retrieve the Recent News on Case data by the Case Number selected and display case news information back to the Custodial Parent user's web browser.

Data Security

Social Security logon, and password is required. Please see Logon Screen/Security and Authentication general design for more details.

Infrastructure Components

Figure 26:
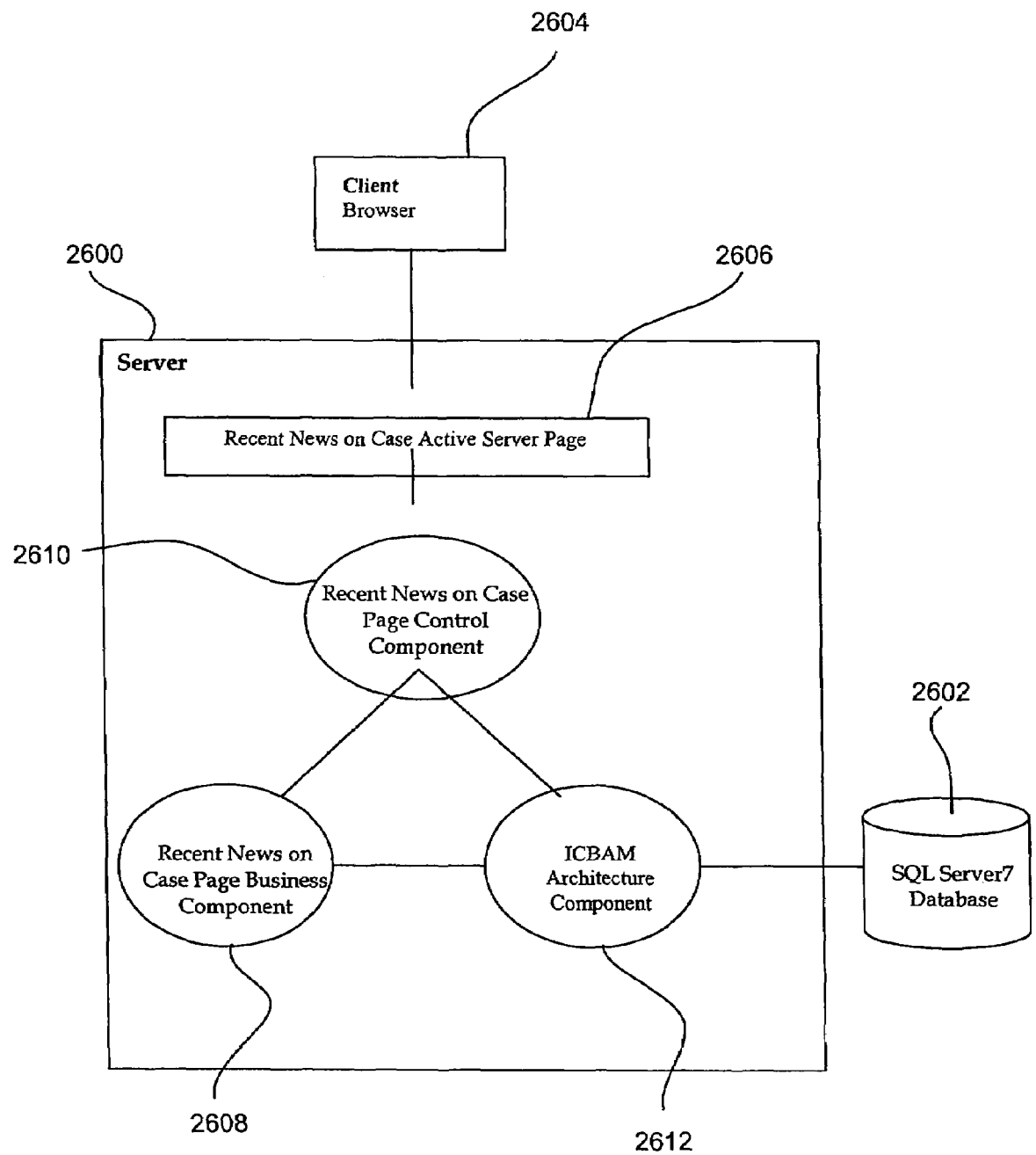
FIG. 26 illustrates the "Recent News on Case" Infrastructure Components.

FIG. 26 depicts an infrastructure of a system for displaying the Recent News on Case. The infrastructure is comprised of the following components:

SQL7 Data Repository on Web Server 2600. An established area on the web server where all files to be used by the eCSE SQL7 data warehouse will be deposited.

Server Microsoft SQL7 Data Warehouse 2602. A robust relational database containing tables with data necessary to encompass the functionality of the current Child Support Enforcement system monthly process.

Client Web Browser Graphical User Interface 2604. The client web based front-end of the application in Hyper Text Markup Language (HTML) which a Custodial Parent client (user) will use to click on a Case Number link from the client's web browser to initiate querying the appropriate SQL server tables and generate requested results back to the client web browser.

Recent News on Case Active Server Page (ASP) 2606. The client web based front-end of the application in Hyper Text Markup Language (HTML) calls on the Recent News on Case Active Server Page to display back to the client browser the most recent information about the progress of a case. The Recent News on Case Active Server Page will contain the following:

Little logic except to interact with the Recent News on Case Page Controller. HTML code to display the results.

Recent News on Case Business Component 2608. The Recent News on Case Business Component defines all of the public interfaces for the Recent News on Case business related components. It is responsible for all the data access to the SQL7 Server Database related to the Recent News on Case data. In addition, the Recent News on Case Display business component will contain the following:
- Majority of the business logic related to Recent News on Case page.
- Implementation of all the well defined interfaces.
- Calls of all backend Application Programmable Interfaces (API) if necessary.
- A Microsoft Transaction Server (MTS) Component.
- Implementation of a declarative and/or programmatic security if necessary. The output result will display a list of the top 25 non-custodial parents who has the highest outstanding child support payments to date back to the client's web browser.

Recent News on Case Display Page Controller 2610. The Recent News on Case Page Controller is a Microsoft Transaction Server (MTS) component that will provide a standard way of transporting data to and from the Recent News on Case Active Server Page through dictionary objects. It implements business logic that would otherwise will reside in the Recent News on Case Display active server page. It is the co-ordinator between the interaction of the Recent News on Case Display ASP and the Recent News on Case Display Business Components. In addition, the Recent News on Case Page Controller will interface with the Internet Information Server event handlers.

ICBAM Architecture Component 2612. The Internet Component Based Architecture Model (ICBAM) component that will provide a the following common architecture services:
- Error handling
- Logging Services
- Database Access
- ID Generation
- Security Service
- Registry Service
- Text Service
- State Maintenance Data Validation Checks The architecture component has error handling routines while retrieving data.

Required Output

A list of recent case action events related to the case number followed by month, date, and year of the action will be displayed from the Recent News on Case Active Server Page. The said data will be viewable online and printable.

Amount Due for the Current Month Display Page

This portion describes the general design for the Amount Due For The Current Month display Page for the electronic Child Support Enforcement Web Application (eCSE). This is achieved by providing an overview of the system's various infrastructure components and their interdependencies.

Objectives

The main objectives of this section are to:
- Provide an overview of the all components and their dependencies of the Amount Due For The Current Month Page.
- Describe the Amount Due For The Current Month Page infrastructure objects in sufficient detail to support their build.
- Act as a reference guide for the Amount Due For The Current Month Page infrastructure objects.

General Design Requirements

The eCSE Amount Due For The Current Month web page is designed to include the functionality required perform the following:

View the Amount Due For The Current Month web page online.

Amount Due for the Current Month Components

Description

Custodial Parent will click the Amount Due For The Current Month link located in the main menu selection bar in the Custodial Parent Case Payment Information Page using a certified web browser.

Data will be retrieved from the SQL7 Server through the ICBAM Architecture. The ICBAM Architecture was built using Microsoft Object Component Technologies (COM). Data will pass through the business logic using the page controller (COM) component to/from the Active Server Pages.

Active server pages will be used to display the Amount Due For The Current Month Information in a paragraph form. The data will display in the form of three paragraphs:

The first paragraph displays as of last case process date, the amount that the non-Custodial Parent owes the Custodial Parent, the amount that has been paid to date, and the total amount still owed to Custodial Parent.

The second paragraph displays the total of all past payments in arrears that the non-Custodial Parent owed to the Custodial Parent and the scheduled payment that the non-Custodial Parent owes the Custodial Parent.

The third paragraph displays the combined total due/payable for the current amount.

Any errors encountered during the data retrieval will be documented in a server error log using the ICBAM Architecture.

Data Input Sources

There are no user inputs required for the Amount Due For The Current Month Web Page. However, when the Custodial Parent logs on, access the case payment information page and clicks on the Amount Due For The Current Month link, the page will capture the following:
- The non-custodial parent name.
- The custodial parent name.
- Case number.

The active server page will retrieve the Amount Due For The Current Month data information formatted in three paragraphs back to the Custodial Parent user's web browser.

Data Security

Social Security logon, and password is required. Please see Logon Screen/Security and Authentication general design document for more details.

Infrastructure Components

Figure 27:
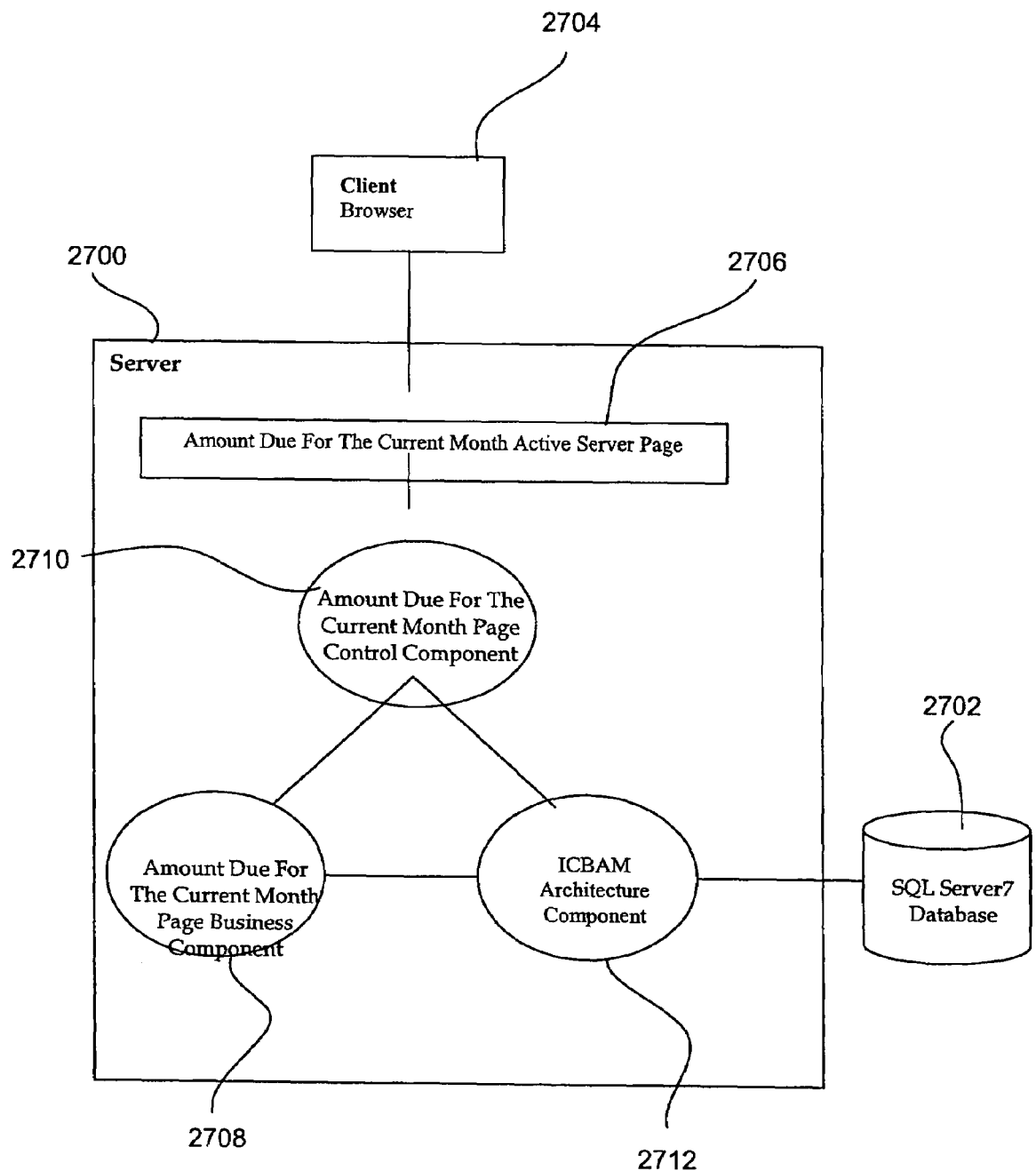
FIG. 27 illustrates the Amount Due For The Current Month Infrastructure Components.

The infrastructure is comprised of the following components, as shown in FIG. 27:

SQL7 Data Repository on Web Server 2700. An established area on the web server where all files to be used by the eCSE SQL7 data warehouse will be deposited.

Server Microsoft SQL7 Data Warehouse 2702. A robust relational database containing tables with data necessary to encompass the functionality of the current Child Support Enforcement system monthly process.

Client Web Browser Graphical User Interface 2704. The client web based front-end of the application in Hyper Text Markup Language (HTML) which a Custodial Parent client (user) will use to click on a Case Number link from the client's web browser to initiate querying the appropriate SQL server tables and generate requested results back to the client web browser.

Amount Due For The Current Month Active Server Page (ASP) 2706. The client web based front-end of the application in Hyper Text Markup Language (HTML) calls on the Amount Due For The Current Month Active Server Page to display back to the client browser the most recent information about the progress of receiving a payment. The Amount Due for the Current Month Active Server Page will contain the following:
- Little logic except to interact with the Amount Due For The Current Month Page Controller.
- HTML code to display the results.

Amount Due For The Current Month Business Component 2708. The Amount Due For The Current Month Business Component defines all of the public interfaces for the Amount Due For The Current Month business related components. It is responsible for all the data access to the SQL7 Server Database related to the Amount Due For The Current Month data. In addition, the Amount Due For The Current Month business component will contain the following:

Majority of the business logic related to Amount Due For The Current Month page.

Implementation of all the well defined interfaces.

Calls of all backend Application Programmable Interfaces (API) if necessary.

A Microsoft Transaction Server (MTS) Component.

Implementation of a declarative and/or programmatic security if necessary.

The output result will display three paragraphs which contains the last case process date, the amount that the non-Custodial Parent owes the Custodial Parent, the amount that has been paid to date, the total amount still owed to Custodial Parent, the total of all past payments in arrears that the non-Custodial Parent owed to the Custodial Parent and the scheduled payment that the non-Custodial Parent owes the Custodial Parent, and the combined total due/payable for the current amount back to the custodial parent's web browser.

Amount Due For The Current Month Page Controller 2710. The Amount Due For The Current Month Page Controller is a Microsoft Transaction Server (MTS) component that will provide a standard way of transporting data to and from the Amount Due For The Current Month Active Server Page through dictionary objects. It implements business logic that would otherwise reside in the Amount Due For The Current Month Active Server Page. It is the co-ordinator between the interaction of the Amount Due For The Current Month Active Server Pages and the Amount Due For The Current Month Business Components. In addition, the Amount Due For The Current Month Page Controller will interface with the Internet Information Server event handlers.

ICBAM Architecture Component 2712. The Internet Component Based Architecture Model (ICBAM) component that will provide the following common architecture services:

Error handling
Logging Services
Database Access
ID Generation
Security Service
Registry Service
Text Service
State Maintenance Data Validation Checks The architecture component has error handling routines while retrieving data.

Required Output

A list of recent case action events related to the case number followed by month, date, and year of the action will be displayed from the Amount Due For The Current Month Active Server Page. The said data will be viewable online and printable. The Amount Due For The Current Month display format where the output results are stored in the < > areas.

Contact Us/Email Connection to Case Worker Display Page

This portion describes the general design for the Contact Us/Email Connection to Case Worker Display Page for the electronic Child Support Enforcement Web Application (eCSE). This is achieved by providing an overview of the system's various infrastructure components and their interdependencies.

Objectives

The main objectives of this section are to:

Provide an overview of the all components and their dependencies of the Contact Us/Email Connection to Case Worker Page.

Describe the Contact Us/Email Connection to Case Worker Page infrastructure objects in sufficient detail to support their build.

Act as a reference guide for the Contact Us/Email Connection to Case Worker Page infrastructure objects.

General Design Requirements

The eCSE Contact Us/Email Connection to Case Worker web page is designed to include the functionality required perform the following:

View the Contact Us/Email Connection to Case Worker web page online.

Send an email correspondence from Internet user to a Case Worker online.

Contact Us/Email Connection to Case Worker Components

Description

Custodial Parent will click the Contact Us link located in the top menu selection bar in the Home Page using a certified web browser. The Contact Us link will be displayed throughout the Child Support Enforcement Web Site.

Data will be retrieved from the SQL7 Server through the ICBAM Architecture. The ICBAM Architecture was built using Microsoft Object Component Technologies (COM).

Data will pass through the business logic using the page controller (COM) component to/from the Active Server Pages.

Active server pages will be used to display the Contact Us—case worker email link, Office phone, local and 800 toll-free, and mailing address. Any errors encountered during the data retrieval will be documented in a server error log using the ICBAM Architecture.

Data Input Sources

There are no user inputs required for the Contact Us Web Page. However, when an Internet User clicks on the URL to access the page, the page will retrieve the Contact Us/Email Connection to Case Worker data by the Case Number selected and display case news information back to the Custodial Parent user's web browser.

Data Security

No security user logon is required.

Infrastructure Components

Figure 28:
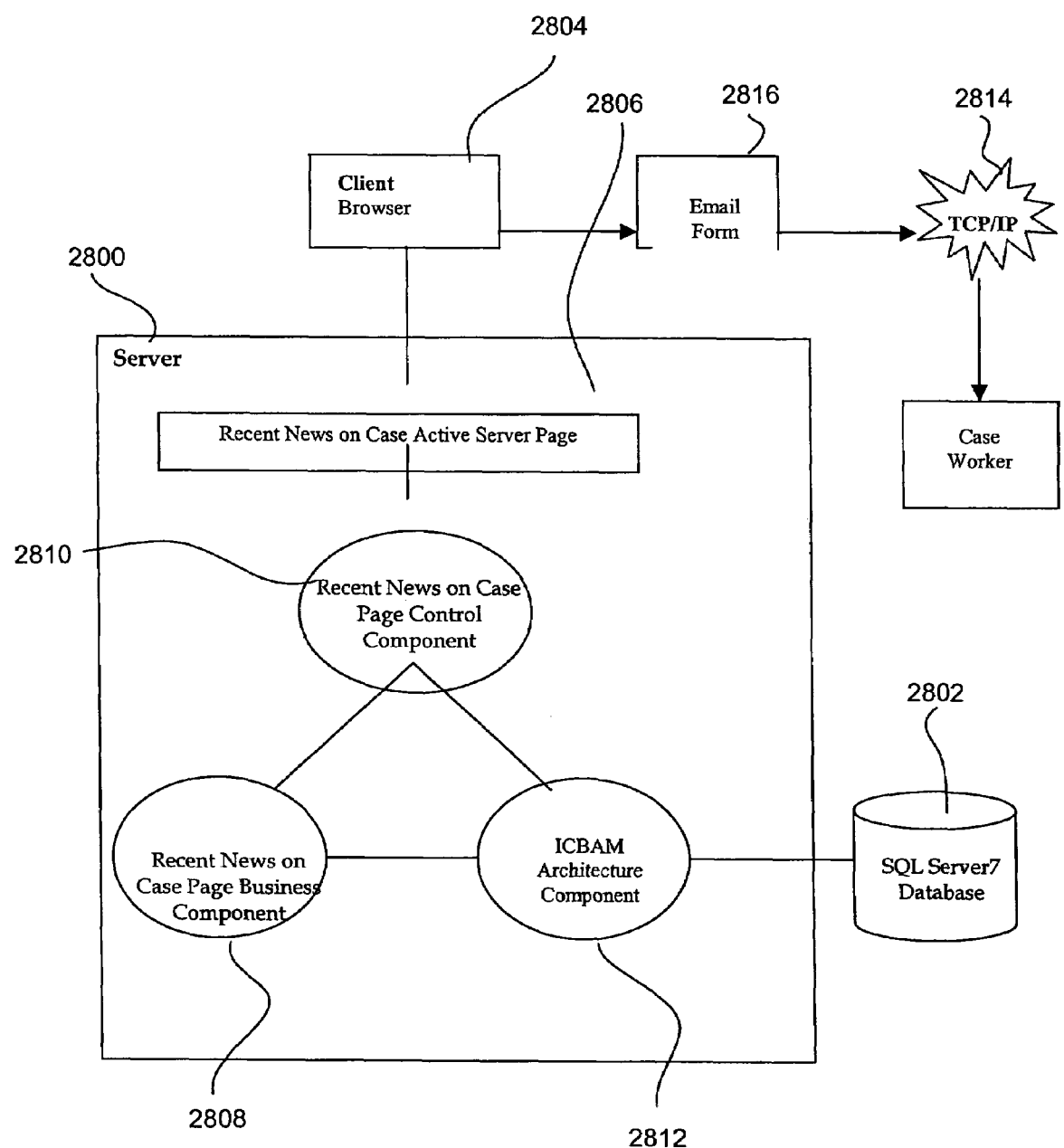
FIG. 28 is a "Contact Us/Email Connection to Case Worker" Infrastructure Components.

As shown in FIG. 28, the infrastructure is comprised of the following components:

SQL7 Data Repository on Web Server 2800. An established area on the web server where all files to be used by the eCSE SQL7 data warehouse will be deposited.

Server Microsoft SQL7 Data Warehouse 2802. A robust relational database containing tables with data necessary to encompass the functionality of the current Child Support Enforcement system monthly process.

Client Web Browser Graphical User Interface 2804. The client web based front-end of the application in Hyper Text Markup Language (HTML) which a Custodial Parent client (user) will use to click on a Case Number link from the client's web browser to initiate querying the appropriate SQL server tables and generate requested results back to the client web browser.

Contact Us/Email Connection to Case Worker Active Server Page (ASP) 2806. The client web based front-end of the application in Hyper Text Markup Language (HTML)

calls on the Contact Us/Email Connection to Case Worker Active Server Page to display back to the client browser the most recent information about the progress of a case. The Contact Us/Email Connection to Case Worker Active Server Page will contain the following:

Little logic except to interact with the Contact Us/Email Connection to Case Worker Page Controller.

HTML code to display the results.

Contact Us/Email Connection to Case Worker Business Component 2808. The Contact Us/Email Connection to Case Worker Business Component defines all of the public interfaces for the Contact Us/Email Connection to Case Worker business related components. It is responsible for all the data access to the SQL7 Server Database related to the Contact Us/Email Connection to Case Worker data. In addition, the Contact Us/Email Connection to Case Worker Display business component will contain the following:

Majority of the business logic related to Contact Us/Email Connection to Case Worker page.

Implementation of all the well defined interfaces.

Calls of all backend Application Programmable Interfaces (API) if necessary.

A Microsoft Transaction Server (MTS) Component.

Implementation of a declarative and/or programmatic security if necessary.

Contact Us/Email Connection to Case Worker Display Page Controller 2810. The Contact Us/Email Connection to Case Worker Page Controller is a Microsoft Transaction Server (MTS) component that will provide a standard way of transporting data to and from the Contact Us Case Worker Active Server Page through dictionary objects. It implements business logic that would otherwise reside in the Contact Us Display active server page. It is the co-ordinator between the interaction of the Contact Us Active Server Pages and the Contact Us Business Components. In addition, the Contact Us Page Controller will interface with the Internet Information Server event handlers.

ICBAM Architecture Component 2812. The Internet Component Based Architecture Model (ICBAM) component that will provide the following common architecture services:

Error handling

Logging Services

Database Access

ID Generation

Security Service

Registry Service

Text Service

State Maintenance

TCP/IP Network 2814. Internet user will send an email correspondence 2816 through the TCP/IP network to the State's email server into a case worker's inbox.

Data Validation Checks

The architecture component has error handling routines while retrieving data. For the email form, the email address in the To: field must be in the standard email address format:

anyname@anybody.com anyname@anybody.net anyname@anybody.org

Required Output

A list of recent case action events related to the case number followed by month, date, and year of the action will be displayed from the Contact Us/Email Connection to Case Worker Active Server Page. The data will be viewable online and printable.

Have You Found the Non-Custodial Parent of My Children Display Page

This portion describes the general design for the Have You Found the Non-Custodial Parent of My Children display Page for electronic Child Support Enforcement Web Application (eCSE). This is achieved by providing an overview of the system's various infrastructure components and their interdependencies.

Objectives

The main objectives of this document are to:

Provide an overview of the all components and their dependencies of the Have You Found the Non-Custodial Parent of My Children Page.

Describe the Have You Found the Non-Custodial Parent of My Children Page infrastructure objects in sufficient detail to support their build.

Act as a reference guide for the Have You Found the Non-Custodial Parent of My Children Page infrastructure objects.

General Design Requirements

The eCSE Have You Found the Non-Custodial Parent of My Children web page is designed to include the functionality required in performing the following:

View the Have You Found the Non-Custodial Parent of My Children web page online.

Link to the Help Manage Case Page.

Have You Found the Non-Custodial Parent of My Children Components

Description

Custodial Parent will click the Have You Found the Non-Custodial Parent of My Children link located in the main menu selection bar in the Custodial Parent Case Payment Information Page using a certified web browser.

Data will be retrieved from the SQL7 Server through the CBAM Architecture. The CBAM Architecture was built using Microsoft Object Component Technologies (COM).

Data will pass through the business logic using the page controller (COM) component to/from the Active Server Pages.

Active server pages will be used to display the Have You Found the Non-Custodial Parent of My Children Information in a paragraph form. The data will display in the form of two paragraphs:

The first paragraph displays the as of last processed date, non-Custodial Parent's full name, and whether or not the non-custodial parent has been located.

The second paragraph displays a message which informs the Custodial Parent to make sure the home and work addresses are correct. If there is new information about the non-Custodial Parent, it will contain a link to the Manage My Case Page.

Any errors encountered during the data retrieval will be documented in a server error log using the CBAM Architecture.

Data Input Sources

There are no user inputs required for the Have You Found the Non-Custodial Parent of My Children Web Page. However, when the Custodial Parent logs on, access the case payment information page and clicks on the Have You Found the Non-Custodial Parent of My Children link, the page will capture the following:

The non-custodial parent name.

The custodial parent name.

Case number.

The active server page will retrieve the Have You Found the Non-Custodial Parent of My Children data information formatted in two paragraphs back to the Custodial Parent user's web browser.

Data Security

Social Security logon, and password is required. Please see Logon Screen/Security and Authentication general design document for more details.

Infrastructure Components

Figure 29:
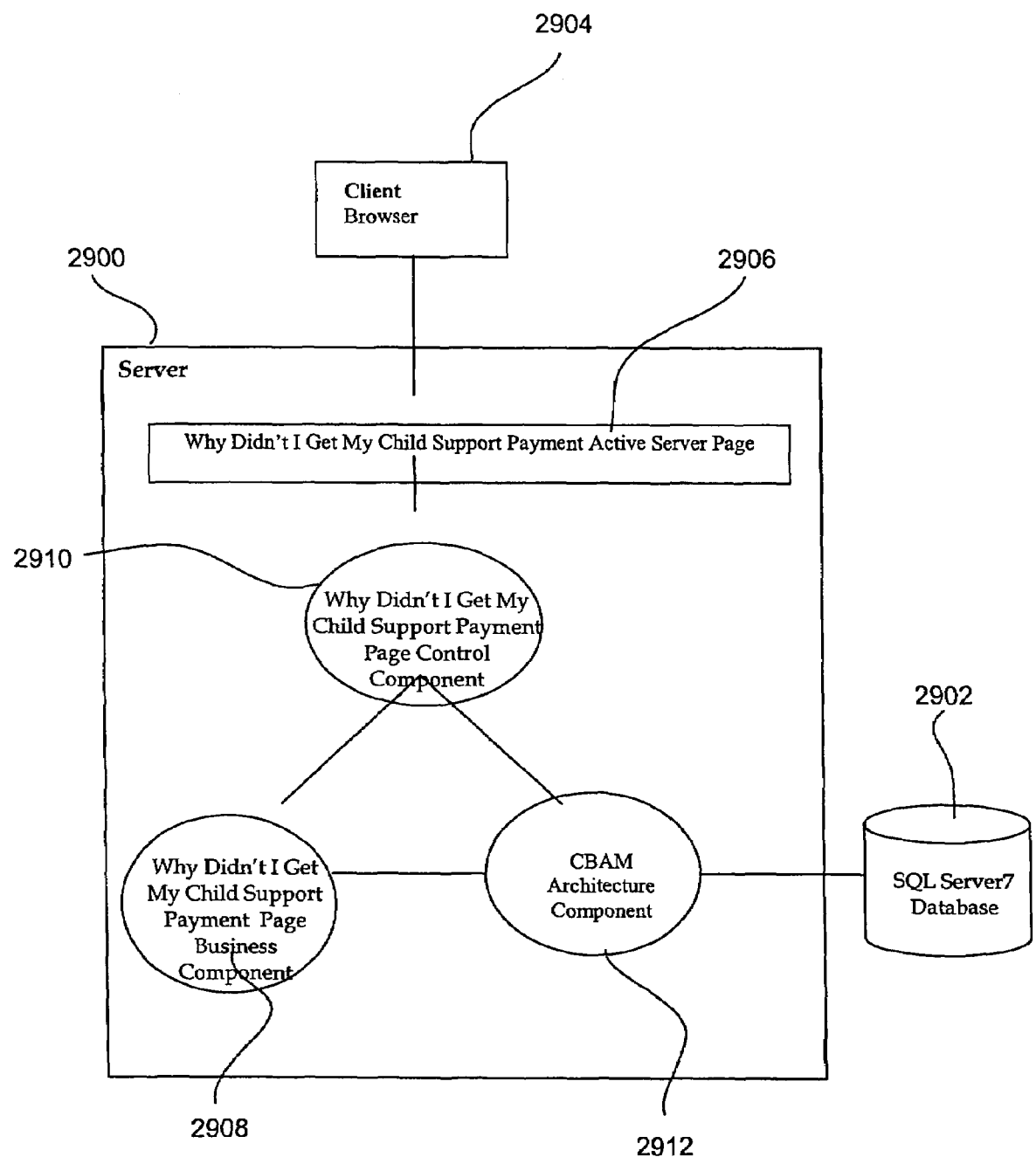
FIG. 29 illustrates the components of the "Have You Found the Non-Custodial Parent of My Children" Infrastructure.

As illustrated in FIG. 29, the infrastructure is comprised of the following components:

SQL7 Data Repository on Web Server 2900. An established area on the web server where all files to be used by the eCSE SQL7 data warehouse will be deposited.

Server Microsoft SQL7 Data Warehouse 2902. A robust relational database containing tables with data necessary to encompass the functionality of the current Child Support Enforcement system monthly process.

Client Web Browser Graphical User Interface 2904. The client web based front-end of the application in Hyper Text Markup Language (HTML) which a Custodial Parent client (user) will use to click on a Case Number link from the client's web browser to initiate querying the appropriate SQL server tables and generate requested results back to the client web browser.

Have You Found the Non-Custodial Parent of My Children Active Server Page (ASP) 2906. The client web based front-end of the application in Hyper Text Markup Language (HTML) calls on the Have You Found the Non-Custodial Parent of My Children Active Server Page to display back to the client browser the most recent information about the reasons of locating or not locating the non-Custodial Parent. The Have You Found the Non-Custodial Parent of My Children Active Server Page will contain the following:

Little logic except to interact with the Have You Found the Non-Custodial Parent of My Children Page Controller.
HTML code to display the results.

Have You Found the Non-Custodial Parent of My Children Business Component 2908. The Have You Found the Non-Custodial Parent of My Children Business Component defines all of the public interfaces for the Have You Found the Non-Custodial Parent of My Children business related components. It is responsible for all the data access to the SQL7 Server Database related to the Have You Found the Non-Custodial Parent of My Children data. In addition, the Have You Found the Non-Custodial Parent of My Children business component will contain the following:

Majority of the business logic related to Have You Found the Non-Custodial Parent of My Children page.
Implementation of all the well defined interfaces.
Calls of all backend Application Programmable Interfaces (API) if necessary.
A Microsoft Transaction Server (MTS) Component.
Implementation of a declarative and/or programmatic security if necessary.

The output result will display two paragraphs which contains the Custodial Parent full name, Case Number, non-Custodial Parent full name, links to the Current Home Address and the non-Custodial Employers Address page back to the custodial parent's web browser.

Have You Found the Non-Custodial Parent of My Children Page Controller 2910. The Have You Found the Non-Custodial Parent of My Children Page Controller is a Microsoft Transaction Server (MTS) component that will provide a standard way of transporting data to and from the Have You Found the Non-Custodial Parent of My Children Active Server Page through dictionary objects. It implements business logic that would otherwise reside in the Have You Found the Non-Custodial Parent of My Children Active Server Page. It is the co-ordinator between the interaction of the Have You Found the Non-Custodial Parent of My Children Active Server Pages and the Have You Found the Non-Custodial Parent of My Children Business Components. In addition, the Have You Found the Non-Custodial Parent of My Children Page Controller will interface with the Internet Information Server event handlers.

CBAM Architecture Component 2912. The Component Based Architecture Model (CBAM) component that will provide the following common architecture services:
Error handling
Logging Services
Database Access
ID Generation
Security Service
Registry Service
Text Service
State Maintenance Data Validation Checks The architecture component has error handling routines while retrieving data.

Required Output

A list of recent case action events related to the case number followed by month, date, and year of the action will be displayed from the Have You Found the Non-Custodial Parent of My Children Active Server Page. The said data will be viewable online and printable.

Where is My Money Display Page

This portion describes the general design for the Where is My Money Display Page for the electronic Child Support Enforcement Web Application (eCSE). This is achieved by providing an overview of the system's various infrastructure components and their interdependencies.

Objectives

The main objectives of this section are to:
Provide an overview of the all components and their dependencies of the Where is My Money Page.
Describe the Where is My Money Page infrastructure objects in sufficient detail to support their build.
Act as a reference guide for the Where is My Money Page infrastructure objects.

General Design Requirements

The eCSE Where is My Money web page is designed to include the functionality required perform the following:
View the Where is My Money web page online Where is My Money Components Description Custodial Parent will click the Where is My Money link located in the main menu selection bar in the Custodial Parent Case Payment Information Page using a certified web browser.

Data will be retrieved from the SQL7 Server through the ICBAM Architecture. The ICBAM Architecture was built using Microsoft Object Component Technologies (COM).

Data will pass through the business logic using the page controller (COM) component to/from the Active Server Pages.

Active server pages will be used to display the Where is My Money Information in a paragraph form. The data will display the current month's payment, The date the payment was mailed to the Custodial Parent, When will the check be delivered, and an option link to set up a direct deposit into the Custodial Parent's account. Any errors encountered during the data retrieval will be documented in a server error log using the ICBAM Architecture.

Data Input Sources

There are no user inputs required for the Where is My Money Web Page. However, when an Internet User clicks on the Where is My Money link, the page will retrieve the Where is My Money data in a paragraph back to the Custodial Parent user's web browser.

Data Security

Social Security logon, and password is required. Please see Logon Screen/Security and Authentication general design document for more details.

Infrastructure Components

Figure 30:
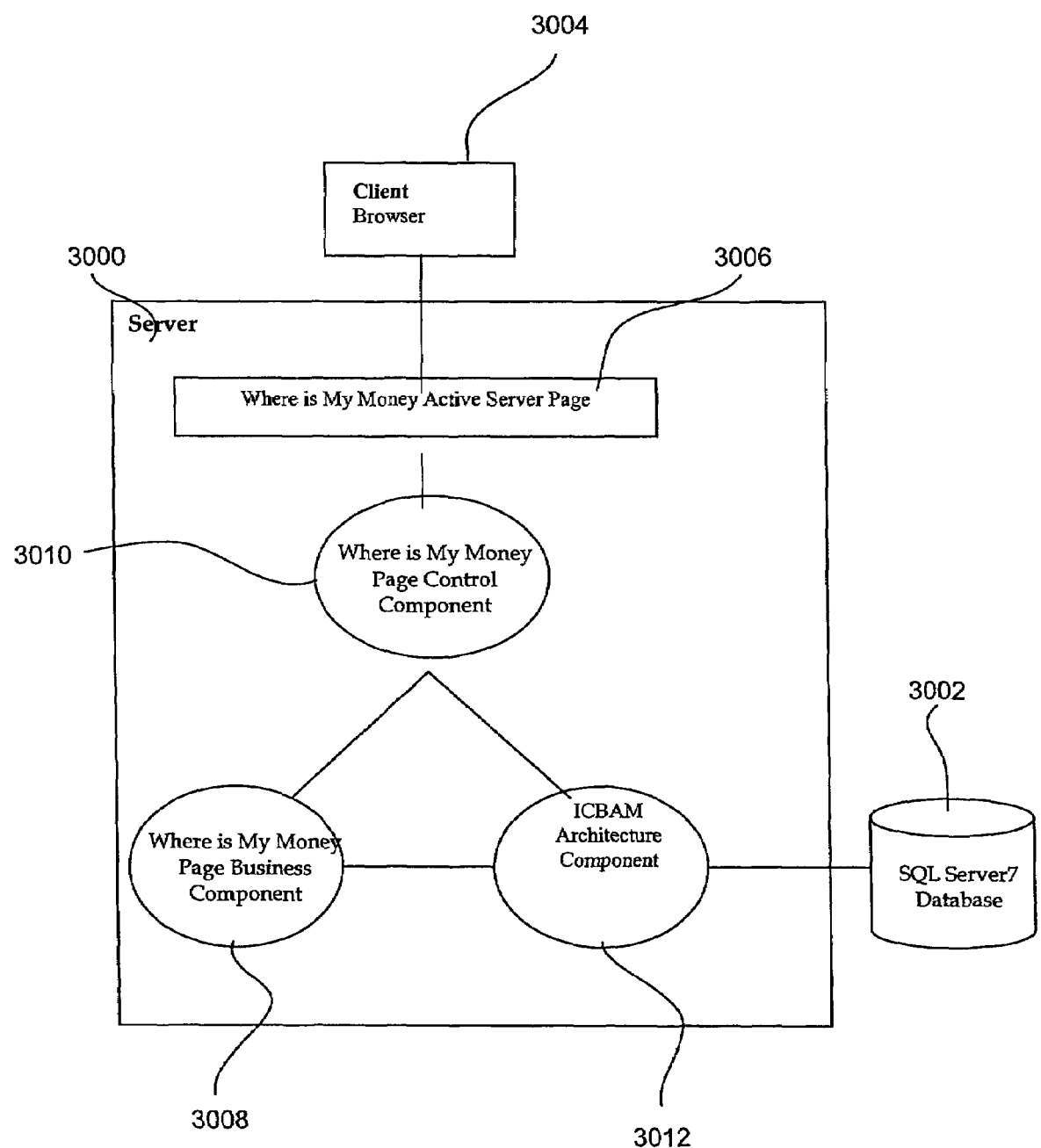
FIG. 30 illustrates the components of the "Where is My Money" Infrastructure.
Figure 31:
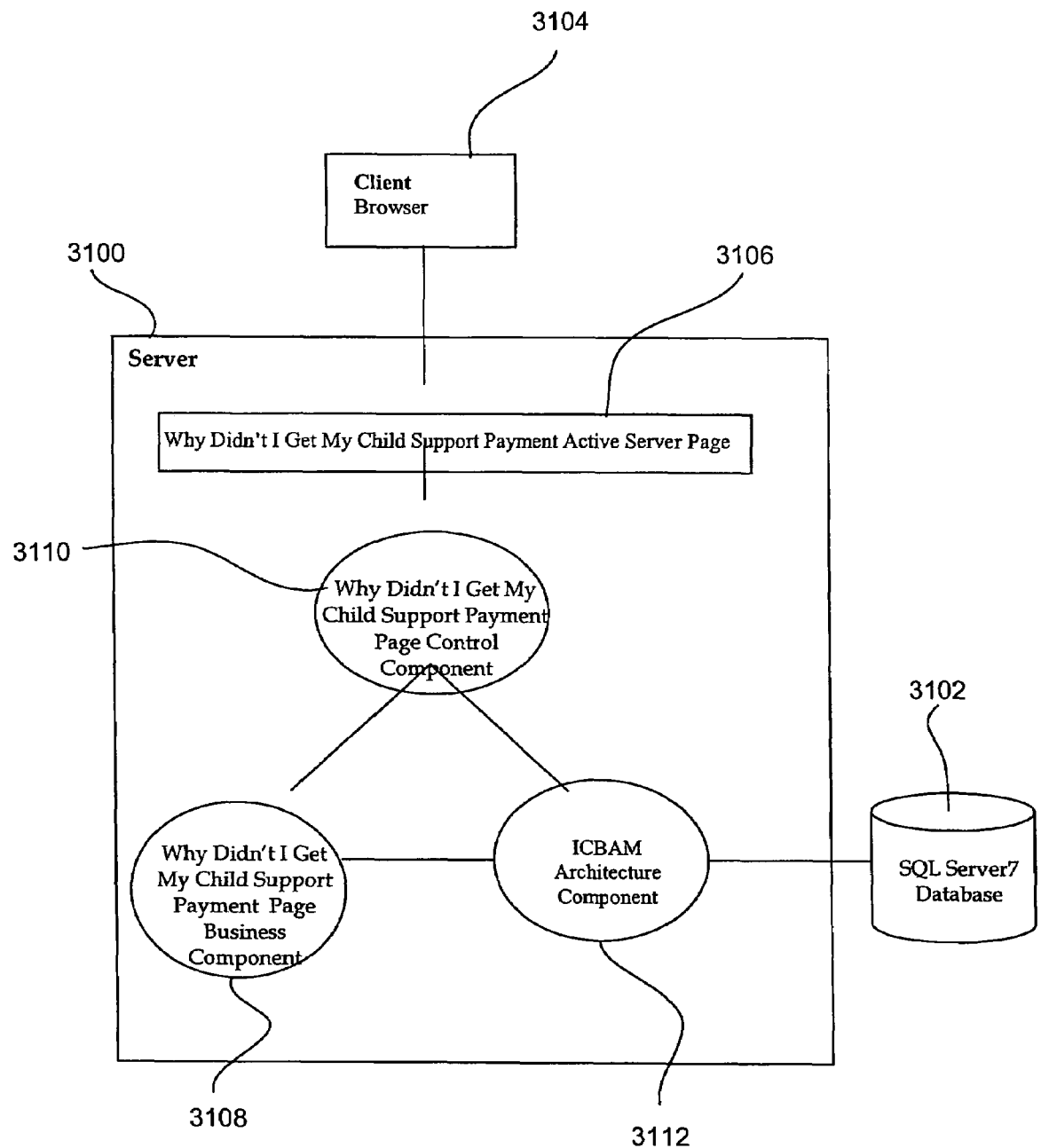
FIG. 31 illustrates the "Why Didn't I Get My Child Support Payment" Infrastructure Components.

The infrastructure is comprised of the following components, shown in FIG. 30:

SQL7 Data Repository on Web Server 3000. An established area on the web server where all files to be used by the eCSE SQL7 data warehouse will be deposited.

Server Microsoft SQL7 Data Warehouse 3002. A robust relational database containing tables with data necessary to encompass the functionality of the current Child Support Enforcement system monthly process.

Client Web Browser Graphical User Interface 3004. The client web based front-end of the application in Hyper Text Markup Language (HTML) which a Custodial Parent client (user) will use to click on a Case Number link from the client's web browser to initiate querying the appropriate SQL server tables and generate requested results back to the client web browser.

Where is My Money Active Server Page (ASP) 3006. The client web based front-end of the application in Hyper Text Markup Language (HTML) calls on the Where is My Money Active Server Page to display back to the client browser the most recent information about the progress of receiving a payment. The Where is My Money Active Server Page will contain the following:

Little logic except to interact with the Where is My Money Page Controller.

HTML code to display the results.

Where is My Money Business Component 3008. The Where is My Money Business Component defines all of the public interfaces for the Where is My Money business related components. It is responsible for all the data access to the SQL7 Server Database related to the Where is My Money data. In addition, the Where is My Money business component will contain the following:

Majority of the business logic related to Where is My Money page.

Implementation of all the well defined interfaces.

Calls of all backend Application Programmable Interfaces (API) if necessary.

A Microsoft Transaction Server (MTS) Component.

Implementation of a declarative and/or programmatic security if necessary.

The output result will display a paragraph of the amount of money, the date the money was mailed back to the custodial parent's web browser.

Where is My Money Page Controller 3010. The Where is My Money Page Controller is a Microsoft Transaction Server (MTS) component that will provide a standard way of transporting data to and from the Where is My Money Active Server Page through dictionary objects. It implements business logic that would otherwise will reside in the Where is My Money Active Server Page. It is the co-ordinator between the interaction of the Where is My Money Active Server Pages and the Where is My Money Business Components. In addition, the Where is My Money Page Controller will interface with the Internet Information Server event handlers.

ICBAM Architecture Component 3012. The Internet Component Based Architecture Model (ICBAM) component that will provide the following common architecture services:

Error handling

Logging Services

Database Access

ID Generation

Security Service

Registry Service

Text Service

State Maintenance

Data Validation Checks

The architecture component has error handling routines while retrieving data.

Required Output

A list of recent case action events related to the case number followed by month, date, and year of the action will be displayed from the Where is My Money Active Server Page. The said data will be viewable online and printable. The Where is My Money display format where the output results are stored in the < > areas.

Why Didn't I Get My Child Support Payment Display Page

This portion describes the general design for the Why Didn't I Get My Child Support Payment display Page for the electronic Child Support Enforcement Web Application (eCSE). This is achieved by providing an overview of the system's various infrastructure components and their interdependencies.

Objectives

The main objectives of this document are to:

Provide an overview of the all components and their dependencies of the Why Didn't I Get My Child Support Payment Page.

Describe the Why Didn't I Get My Child Support Payment Page infrastructure objects in sufficient detail to support their build.

Act as a reference guide for the Why Didn't I Get My Child Support Payment Page infrastructure objects.

General Design Requirements

The eCSE Why Didn't I Get My Child Support Payment web page is designed to include the functionality required perform the following:

View the Why Didn't I Get My Child Support Payment web page online.

Link to update the current Home Address of the non-Custodial and/or Custodial Parent.

Link to update the Employer's Address of the non-Custodial Parent.

Why Didn't I Get My Child Support Payment Components

Description

Custodial Parent will click the Why Didn't I Get My Child Support Payment link located in the main menu selection bar in the Custodial Parent Case Payment Information Page using a certified web browser.

Data will be retrieved from the SQL7 Server through the ICBAM Architecture. The ICBAM Architecture was built using Microsoft Object Component Technologies (COM).

Data will pass through the business logic using the page controller (COM) component to/from the Active Server Pages.

Active server pages will be used to display the Why Didn't I Get My Child Support Payment Information in a paragraph form. The data will display in the form of two paragraphs:

The first paragraph displays the reason the payment was not received, and the non-Custodial Parent's full name.

The second paragraph displays a message which informs the Custodial Parent to make sure the current address is correct. In addition, the second paragraph will contain the links to the Current Address Page and Current Employers Address Page of the non-Custodial Parent.

Any errors encountered during the data retrieval will be documented in a server error log using the ICBAM Architecture.

Data Input Sources

There are no user inputs required for the Why Didn't I Get My Child Support Payment Web Page. However, when the Custodial Parent logs on, access the case payment information page and clicks on the Why Didn't I Get My Child Support Payment link, the page will capture the following:

The non-custodial parent name.
The custodial parent name.
Case number.

The active server page will retrieve the Why Didn't I Get My Child Support Payment data information formatted in two paragraphs back to the Custodial Parent user's web browser.

Data Security

Social Security logon, and password is required. Please see Logon Screen/Security and Authentication general design document for more details.

Infrastructure Components

The infrastructure is comprised of the following components:

SQL7 Data Repository on Web Server 3100. An established area on the web server where all files to be used by the eCSE SQL7 data warehouse will be deposited.

Server Microsoft SQL7 Data Warehouse 3102. A robust relational database containing tables with data necessary to encompass the functionality of the current Child Support Enforcement system monthly process.

Client Web Browser Graphical User Interface 3104. The client web based front-end of the application in Hyper Text Markup Language (HTML) which a Custodial Parent client (user) will use to click on a Case Number link from the client's web browser to initiate querying the appropriate SQL server tables and generate requested results back to the client web browser.

Why Didn't I Get My Child Support Payment Active Server Page (ASP) 3106. The client web based front-end of the application in Hyper Text Markup Language (HTML) calls on the Why Didn't I Get My Child Support Payment Active Server Page to display back to the client browser the most recent information about the reasons of not receiving a payment. The Why Didn't I Get My Child Support Payment Active Server Page will contain the following:

Little logic except to interact with the Why Didn't I Get My Child Support Payment Page Controller.
HTML code to display the results.

Why Didn't I Get My Child Support Payment Business Component 3108. The Why Didn't I Get My Child Support Payment Business Component defines all of the public interfaces for the Why Didn't I Get My Child Support Payment business related components. It is responsible for all the data access to the SQL7 Server Database related to the Why Didn't I Get My Child Support Payment data. In addition, the Why Didn't I Get My Child Support Payment business component will contain the following:

Majority of the business logic related to Why Didn't I Get My Child Support Payment page.
Implementation of all the well defined interfaces.
Calls of all backend Application Programmable Interfaces (API) if necessary.
A Microsoft Transaction Server (MTS) Component.
Implementation of a declarative and/or programmatic security if necessary.

The output result will display two paragraphs which contains the Custodial Parent full name, Case Number, non-Custodial Parent full name, links to the Current Home Address and the non-Custodial Employers Address page back to the custodial parent's web browser.

Why Didn't I Get My Child Support Payment Page Controller 3110. The Why Didn't I Get My Child Support Payment Page Controller is a Microsoft Transaction Server (MTS) component that will provide a standard way of transporting data to and from the Why Didn't I Get My Child Support Payment Active Server Page through dictionary objects. It implements business logic that would otherwise will reside in the Why Didn't I Get My Child Support Payment Active Server Page. It is the co-ordinator between the interaction of the Why Didn't I Get My Child Support Payment Active Server Pages and the Why Didn't I Get My Child Support Payment Business Components. In addition, the Why Didn't I Get My Child Support Payment Page Controller will interface with the Internet Information Server event handlers.

ICBAM Architecture Component 3112. The Internet Component Based Architecture Model (ICBAM) component that will provide the following common architecture services:

Error handling
Logging Services
Database Access
ID Generation
Security Service
Registry Service
Text Service
State Maintenance Data Validation Checks The architecture component has error handling routines while retrieving data.

Required Output

A list of recent case action events related to the case number followed by month, date, and year of the action will be displayed from the Why Didn't I Get My Child Support Payment Active Server Page. The said data will be viewable online and printable.

Although only a few embodiments of the present invention have been described in detail herein, it should be understood that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A method, implemented using a computer, for providing a network-based child financial support framework for facilitating communications between employers, custodial parents, and noncustodial parents, the method comprising the steps of:

maintaining a database including information on a received financial support payment utilizing a network;

providing general information relating to the financial support payment utilizing the network;

calculating, using the computer, a proper amount of the financial support payment based on a profile of a user and based on an amount paid to date from a non-custodial parent to a custodial parent, wherein the profile includes data relating to at least one of income, number of children, basic support, insurance premium, child care cost, and additional expenses, wherein a first portion of the profile is received from the user across the network and a second portion of the profile is received from the database, and wherein the user may change the data in the second portion of the profile;

displaying a history associated with the financial support payment;

receiving identification information from the user;

determining, from the identification information, if the user is the custodial parent or the non-custodial parent;

providing, only after determining the user is the custodial parent, an customized interface configured to allow the custodial parent to retrieve tracking information for the financial support payment and a plurality of historical financial support payments previously scheduled to the custodial parent, said tracking information including payment status, payment amount due, payment amount received, payment date, payment receipt date, payment sent date, payment available withdrawal date, and payment case number, said tracking information further including reasons why a scheduled financial support payment was not dispersed if the scheduled financial support payment has not been received by the custodial parent; and displaying, to the custodial parent via the interface, the retrieved tracking information for the financial support payment and the plurality of historical financial support payments.

2. The method as recited in claim 1, wherein the network includes the Internet.

3. The method as recited in claim 1, wherein the history includes a date, an amount received on the date, an amount retained of the amount received, and a disbursement of the amount received to the custodial parent.

4. The method as recited in claim 1, further comprising the step of presenting a plurality of frequently asked questions relating to the financial support payment.

5. The method as recited in claim 1, said providing an interface configured to allow the custodial parent to retrieve information related to the financial support payment and a plurality of historical financial support payments previously scheduled to the custodial parent further comprising determining a status of said information.

6. The method as recited in claim 1, said providing an interface configured to allow the custodial parent to retrieve information related to the financial support payment and a plurality of historical financial support payments previously scheduled to the custodial parent further comprising submitting questions regarding said information and receiving answers to said questions.

7. A computer-readable medium including a computer program encoded thereon which, when executed, causes a computer to perform a method for providing a network-based child financial support framework for facilitating communications between employers, custodial parents, and non-custodial parents, the method comprising:

maintaining a database including information on a received financial support payment utilizing a network;

providing general information relating to the financial support payment utilizing the network;

calculating a proper amount of the financial support payment based on a profile of a user and based on an amount paid to date from a noncustodial parent to a custodial parent, wherein the profile includes data relating to at least one of income, number of children, basic support, insurance premium, child care cost, and additional expenses, wherein a first portion of the profile is received from the user across the network and a second portion of the profile is received from the database, and wherein the user may change the data in the second portion of the profile;

displaying a history associated with the financial support payment;

receiving identification information from the user;

determining, from the identification information, if the user is the custodial parent or the non-custodial parent;

providing, only after determining the user is the custodial parent, an customized interface configured to allow the custodial parent to retrieve tracking information for the financial support payment and a plurality of historical financial support payments previously scheduled to the custodial parent, said tracking information including payment status, payment amount due, payment amount received, payment date, payment receipt date, payment sent date, payment available withdrawal date, and payment case number, said tracking information further including reasons why a scheduled financial support payment was not dispersed if the scheduled financial support payment has not been received by the custodial parent; and displaying, to the custodial parent via the interface, the retrieved tracking information for the financial support payment and the plurality of historical financial support payments.

8. The computer-readable medium as recited in claim 7, wherein the network includes the Internet.

9. The computer-readable medium as recited in claim 7, wherein the history includes a date, an amount received on the date, an amount retained of the amount received, and a disbursement of the amount received to the custodial parent.

10. The computer-readable medium as recited in claim 7, and further comprising a code segment that presents a plurality of frequently asked questions relating to the financial support payment.

11. The computer-readable medium as recited in claim 7, said providing an interface configured to allow the custodial parent to retrieve information related to the financial support payment and a plurality of historical financial support payments previously scheduled to the custodial parent further comprising determining a status of said information.

12. The computer-readable medium as recited in claim 7, said providing an interface configured to allow the custodial parent to retrieve information related to the financial support payment and a plurality of historical financial support payments previously scheduled to the custodial parent further comprising submitting questions regarding said information and receiving answers to said questions.

13. A system for providing a network-based child financial support framework for facilitating communications between employers, custodial parents, and noncustodial parents, comprising:

logic that maintains a database including information on a received financial support payment utilizing a network;

logic that provides general information relating to the financial support payment utilizing the network;

logic that calculates a proper amount of the financial support payment based on a profile of a user and based on an amount paid to date from a non-custodial parent to a custodial parent, wherein the profile includes data relating to at least one of income, number of children, basic support, insurance premium, child care cost, and additional expenses, wherein a first portion of the profile is received from the user across the network and a second portion of the profile is received from the database, and wherein the user may change the data in the second portion of the profile; and logic that displays a history associated with the financial support payment;

logic that receives identification information from the user;

logic that determines, from the identification information, if the user is the custodial parent or the non-custodial parent;

logic that provides, only after determining the user is the custodial parent, an customized interface configured to allow the custodial parent to retrieve tracking information for the financial support payment and a plurality of historical financial support payments previously scheduled to the custodial parent, said tracking information including payment status, payment amount due, payment amount received, payment date, payment receipt date, payment sent date, payment available withdrawal date, and payment case number, said tracking information further including reasons why a scheduled financial support payment was not dispersed if the scheduled financial support payment has not been received by the custodial parent; and logic that displays, to the custodial parent via the interface, the retrieved tracking information for the financial support payment and the plurality of historical financial support payments.

14. The system as recited in claim 13, wherein the network includes the Internet.

15. The system as recited in claim 13, wherein the history includes a date, an amount received on the date, an amount retained of the amount received, and a disbursement of the amount received to the custodial parent.

16. The system as recited in claim 13, and further comprising logic that presents a plurality of frequently asked questions relating to the financial support payment.

17. The system as recited in claim 13, said logic that provides an interface configured to allow the custodial parent to retrieve information related to the financial support payment and a plurality of historical financial support payments previously scheduled to the custodial parent further comprising determining a status of said information.

18. The system as recited in claim 13, said logic that provides an interface configured to allow the custodial parent to retrieve information related to financial support payments and a plurality of historical financial support payments previously scheduled to the custodial parent further comprising submitting questions regarding said information and receiving answers to said questions.

* * * * *

UNITED STATES PATENT AND TRADEMARK OFFICE
CERTIFICATE OF CORRECTION

PATENT NO. : 7,716,059 B1 Page 1 of 1
APPLICATION NO. : 09/560665
DATED : May 11, 2010
INVENTOR(S) : David Wilkins et al.

It is certified that error appears in the above-identified patent and that said Letters Patent is hereby corrected as shown below:

Title page, item (75), "Inventors," Line 4, "Keith Kethcher, Cheynne, WY (US)" should read --Keith Ketcher, Sacramento, CA--.

Signed and Sealed this

Sixth Day of July, 2010

David J. Kappos
*Director of the United States Patent and Trademark Office*